(12) United States Patent
Hathiramani

(10) Patent No.: US 11,405,826 B2
(45) Date of Patent: Aug. 2, 2022

(54) CROSS CELL OFFLOADING

(71) Applicant: Nokia Technologies Oy, Espoo (FI)

(72) Inventor: Navin Hathiramani, Coppell, TX (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/912,384

(22) Filed: Jun. 25, 2020

(65) Prior Publication Data

US 2021/0410011 A1 Dec. 30, 2021

(51) Int. Cl.
*H04W 28/08* (2009.01)
*H04W 72/00* (2009.01)
*H04W 76/16* (2018.01)
*H04W 68/00* (2009.01)
*H04W 72/04* (2009.01)

(52) U.S. Cl.
CPC ..... *H04W 28/085* (2013.01); *H04W 28/0804* (2020.05); *H04W 28/0942* (2020.05); *H04W 68/005* (2013.01); *H04W 72/005* (2013.01); *H04W 72/046* (2013.01); *H04W 76/16* (2018.02)

(58) Field of Classification Search
CPC .......... H04W 28/085; H04W 28/0942; H04W 28/0804; H04W 72/005; H04W 72/046; H04W 76/16; H04W 68/005
See application file for complete search history.

(56) References Cited

U.S. PATENT DOCUMENTS

| | | | |
|---|---|---|---|
| 2014/0204771 A1* | 7/2014 | Gao | H04W 36/22 370/252 |
| 2015/0045038 A1* | 2/2015 | Gao | H04W 36/22 455/438 |
| 2016/0007271 A1* | 1/2016 | Plicanic Samuelsson | H04W 40/22 455/552.1 |
| 2017/0026938 A1* | 1/2017 | Onggosanusi | H04L 5/0053 |
| 2018/0020462 A1 | 1/2018 | Xiong et al. | |
| 2019/0190686 A1* | 6/2019 | Ye | H04L 27/2666 |
| 2019/0357133 A1* | 11/2019 | Jactat | H04W 76/18 |
| 2020/0288338 A1* | 9/2020 | Freda | H04W 76/27 |
| 2020/0404638 A1* | 12/2020 | Deogun | H04L 5/0091 |
| 2021/0168779 A1* | 6/2021 | Mondal | H04L 5/0035 |

FOREIGN PATENT DOCUMENTS

| | | |
|---|---|---|
| JP | 5269898 B2 | 8/2013 |
| WO | 2009/009394 A1 | 1/2009 |

* cited by examiner

*Primary Examiner* — Robert C Scheibel
(74) *Attorney, Agent, or Firm* — Harrington & Smith

(57) ABSTRACT

There is at least a method and apparatus to offload to or receive an offload at least one other cell of a same or different radio access technology at least one beam of more than one beam associated with at least one user equipment of the cell; and based on the determining, forwarding or receiving information including at least one control message identifying the at least one beam associated with the at least one user equipment of the cell to the at least one other cell to perform the offload to the cell, and to perform receiving, by user equipment of a cell of a communication network, from another cell of a same or different radio access technology information.

14 Claims, 18 Drawing Sheets

MIB PARAMETERS RELATED TO SIB1

| PARAMETER NAME | LENGTH (BITS) | RANGE |
|---|---|---|
| ControlResourceSetZero | 4 | 0...15 |
| SearchSpaceZero | 4 | 0...15 |
| ssb-SubcarrierOffset | 5 | 0...31 |

FIG.13

| KSSB | Rel 16 STATUS |
|---|---|
| 0 | NOT USED |
| 1 | NOT USED |
| 2 | NOT USED |
| 3 | NOT USED |
| 4 | NOT USED |
| 5 | NOT USED |
| 6 | NOT USED |
| 7 | NOT USED |
| 8 | NOT USED |
| 9 | NOT USED |
| 10 | NOT USED |
| 11 | NOT USED |
| 12 | FR2 |
| 13 | FR2 |
| 14 | RESERVED FR2 |
| 15 | NOT USED |
| 16 | NOT USED |
| 17 | NOT USED |
| 18 | NOT USED |
| 19 | NOT USED |
| 20 | NOT USED |
| 21 | NOT USED |
| 22 | NOT USED |
| 23 | NOT USED |
| 24 | FR1 |
| 25 | FR1 |
| 26 | FR1 |
| 27 | FR1 |
| 28 | FR1 |
| 29 | FR1 |
| 30 | RESERVED FR1 |
| 31 | NOT USED |

→ 256 CONFIGS AVAILABLE PER UNUSED KSSB VALUE

FIG.14

CROSS CELL OFFLOADING

TECHNICAL FIELD

The teachings in accordance with the exemplary embodiments of this invention relate generally to enabling offload of paging messages and/or system information messages for certain beams between different cells and, more specifically, relate to enabling offload of paging messages and/or system information messages for certain beams between different cells which may be applying different radio access technologies.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
5GC: 5G core
BTS: Base Station Transceiver
CN: Core Network
CRS: Cell Specific Reference symbol
DSS: Dynamic Spectrum Sharing
EPC: Evolved Packet Core
IE: Information Element
LTE: Long Term Evolution
MIB: Master Information Block
NR: New Radio
NR-ARFCN: New Radio Absolute Radio Frequency Channel Number
OSI: Other System Information
OTA: Over the Air
Pcell: Primary Cell
PDCCH: Physical Downlink Control Channel
RAT: Radio Access Technology
RM: Rate Matching
SI: System Information
SIB: System Information Block
SSB: Synchronization Signal Block
UE: User Equipment LTE-NR Dynamic Spectrum Sharing(DSS) was introduced in 3GPP Rel.15 as a framework to enable smooth spectrum migration from one RAT technology to another. DSS allows for progressive resource(frequency) dedication to NR, as NR device penetration increases.

At the time of this application LTE-NR DSS solutions are gaining traction and initial tests are already being performed in fields and labs prior to commercial deployments, however the performance of NR appears hindered by LTE restrictions and additional overheads Initial DSS deployments are based on ENDC architectures but one next step can be to enable NR DSS cells to operate in standalone mode, i.e., as a Pcell.

Example embodiments of the invention as disclosed herein work to overcome obstacles and provide improvements for at least similar operations.

SUMMARY

In an example aspect of the invention, there is an apparatus, such as a network side apparatus, comprising: at least one processor; and at least one memory including computer program code, where the at least one memory and the computer program code are configured, with the at least one processor, to cause the apparatus to at least: determine, by a network node of a cell of a communication network, to offload to at least one other cell of a same or different radio access technology at least one beam of more than one beam associated with at least one user equipment of the cell. Then, based on the determining, forward information comprising at least one control message identifying the at least one beam associated with the at least one user equipment of the cell to the at least one other cell to perform the offload to the cell.

In another example aspect of the invention, there is a method comprising: determining, by a network node of a cell of a communication network, to offload to at least one other cell of a same or different radio access technology at least one beam of more than one beam associated with at least one user equipment of the cell. Then there is, based on the determining, forwarding information comprising at least one control message identifying the at least one beam associated with the at least one user equipment of the cell to the at least one other cell to perform the offload to the cell. A further example embodiment is a method comprising the method of the previous paragraph, wherein the information comprises at least one information block configured with the at least one control message for broadcasting towards the at least one user equipment to at least identify the at least one beam of the offload; wherein the at least one information block is identifying the at least one other cell where the at least one beam is offloaded to; wherein the offload comprises at least one of an offload of system information broadcasting or an offload of paging messages broadcasting from a serving cell for the at least one user equipment, wherein the system information offload or paging message offload can be partial or total, and wherein the network node may choose to broadcast the system information messages or the paging messages for specific beams and offload the SI messages or the paging messages for other beams to another cell; wherein the at least one control message is for at least one paging message associated with the at least one user equipment, and wherein the configuring comprises: configuring the at least one information block to inform the at least one user equipment, when it receives the at least one paging message offload from the cell, at least one of a paging priority for a user equipment of the at least one user equipment or a cell of the communication network that the user equipment of at least one user equipment should respond to; wherein based on the at least one user equipment being registered in the at least one other cell, the configuring comprises: configuring the at least one information block to allow the at least one user equipment to respond to paging messages of the at least one paging message for certain types of service in the at least one other cell; wherein the configuring comprises: configuring the at least one control message of the at least one information block to prioritize paging messages of the at least one paging message based on the paging messages being associated with at least one of a high reliability service or low latency service which can comprise a voice call; wherein the at least one information block comprises at least one of a master information block or system information block; wherein the at least one control message of the at least one information block is for at least one of a paging message or System information message associated with the at least one user equipment, and wherein the at least one control message is to allow the at least one user equipment to receive only paging messages of the at least one paging message or System Information message which are for certain types of service in the another cell, wherein the at least one information block is communicated with the at least one other cell is using an X2 interface wherein the at least one control message is for at least one system information message associated with the at least one user equipment, and wherein the configuring comprises: configuring the at least one information block to inform the at least one user equipment from which cell of the communication network that the least one system information message is received, wherein based on the at least one user equipment being registered in the at least one other cell, the configuring comprises: configuring the at least one information block to inform the at least one user equipment from which cell of the communication network that the least one system information message is received; configuring the at least one information block to allow the at least one user equipment to receive system information messages of the at least one system information message for certain types of service in the at least one other cell, wherein the configuring comprises: configuring the at least one control message of the at least one information block to prioritize paging messages of the at least one paging message based on the paging messages being associated with specific services, wherein the specific services comprises at least one of high reliability services or low latency services, and/or wherein the specific services comprises voice call services.

A non-transitory computer-readable medium storing program code, the program code executed by at least one processor to perform at least the method as described in the paragraphs above.

In another example aspect of the invention, there is an apparatus comprising: means for determining, by a network node of a cell of a communication network, to offload to at least one other cell of a same or different radio access technology at least one beam of more than one beam associated with at least one user equipment of the cell. Then there is, based on the determining, forwarding information comprising at least one control message identifying the at least one beam associated with the at least one user equipment of the cell to the at least one other cell to perform the offload to the cell.

In accordance with the example embodiments as described in the paragraph above, at least the means for configuring and sending comprises a network interface, and computer program code stored on a computer-readable medium and executed by at least one processor.

A further example embodiment is an apparatus comprising the apparatus of the previous paragraphs, wherein the information comprises at least one information block configured with the at least one control message for broadcasting towards the at least one user equipment to at least identify the at least one beam of the offload; wherein the at least one information block is identifying the at least one other cell where the at least one beam is offloaded to; wherein the offload comprises at least one of an offload of system information broadcasting or an offload of paging messages broadcasting from a serving cell for the at least one user equipment, wherein the system information offload or paging message offload can be partial or total, and wherein the network node may choose to broadcast the system information messages or the paging messages for specific beams and offload the SI messages or the paging messages for other beams to another cell; wherein the at least one control message is for at least one paging message associated with the at least one user equipment, and wherein the configuring comprises: configuring the at least one information block to inform the at least one user equipment, when it receives the at least one paging message offload from the cell, a cell of the communication network that the user equipment of at least one user equipment should respond to; wherein based on the at least one user equipment being registered in the at least one other cell, the configuring comprises: means for configuring the at least one information block to allow the at least one user equipment to respond to paging messages of the at least one paging message for certain types of service in the at least one other cell; wherein the configuring comprises: means for configuring the at least one control message of the at least one information block to prioritize paging messages of the at least one paging message based on the paging messages being associated with at least one of a high reliability service or low latency service which can comprise a voice call; wherein the at least one information block comprises at least one of a master information block or system information block; wherein the at least one control message of the at least one information block is for at least one of a paging message or System information message associated with the at least one user equipment, and wherein the at least one control message is to allow the at least one user equipment to receive only paging messages of the at least one paging message or System Information message which are for certain types of service in the another cell; and/or wherein the at least one information block is communicated with the at least one other cell is using an X2 interface.

In an example aspect of the invention, there is an apparatus, such as a network side apparatus, comprising: at least one processor; and at least one memory including computer program code, where the at least one memory and the computer program code are configured, with the at least one processor, to cause the apparatus to at least: determine, by a network device of a cell of a communication network, to accept from another cell of a same or different radio access technology in the communication network an offload of at least one beam of more than one beam associated with at least one user equipment of the another cell. Then, based on the determining, receive information comprising at least one control message identifying the at least one beam associated with the at least one user equipment offload from the another cell.

In another example aspect of the invention, there is a method comprising: determining, by a network device of a cell of a communication network, to accept from another cell of a same or different radio access technology in the communication network an offload of at least one beam of more than one beam associated with at least one user equipment of the another cell. Then, based on the determining, receiving information comprising at least one control message identifying the at least one beam associated with the at least one user equipment offload from the another cell.

In accordance with the example embodiments as described in the paragraph above, wherein the determining comprises: determining to accept the offload from the another cell; and based on the acceptance, setting up with the another cell a connection for receiving the information.

A further example embodiment is a method comprising the method of the previous paragraph, wherein the connection is using an internode interface such as an X2 and/or Xn interface; wherein the information comprises at least one information block configured with the at least one control message for broadcasting towards the at least one user equipment to at least identify to the at least one user equipment the at least one beam for the offload; wherein the at least one control message is identifying a cells radio access technology, frequency, timing acquisition, and/or at least one new information element associated with acquisition of said information; wherein there is broadcasting towards the at least one user equipment information comprising the at least one information block, wherein the at least one control message of the at least one information block is for at least one paging message associated with the at least one user equipment, and wherein the at least one control message to allow the at least one user equipment to receive only paging messages of the at least one paging message which are for certain types of service in the another cell; wherein there is providing to the at least one user equipment information comprising at least a channel frequency and radio access technology of the another cell for the offload; and based on the information, synching with the at least one user equipment on the radio access technology of the another cell to provide to the at least one user equipment a timing and periodicity of system information messages broadcast in the another cell; wherein providing the information is performed one of before or after a handover of the at least one user equipment to the another cell; wherein the at least one control message is prioritizing in response at the cell paging message responses to at least one of a high reliability service or low latency service which can comprise a voice call service; wherein the at least one information block comprises at least one of a master information block or system information block; wherein the at least one control message of the at least one information block is for at least one of a paging message or System information message associated with the at least one user equipment, and wherein the at least one control message is to allow the at least one user equipment to receive only paging messages of the at least one paging message or System Information message which are for certain types of service in the another cell; and/or wherein the determining comprises: determining to accept the offload from the another cell; and based on the acceptance, setting up with the another cell a connection for receiving the information; wherein the at least one control message of the at least one information block is for at least one system information message associated with the at least one user equipment; wherein the at least one control message to allow the at least one user equipment to receive system information messages which are for certain types of service in the another cell or different cell, such as for example specific services; wherein the specific services comprises at least one of high reliability services or low latency services, wherein the specific services comprises voice call services; wherein there is providing to the at least one user equipment information comprising at least a channel frequency and radio access technology of the another cell for the offload; and based on the information, synching with the at least one user equipment on the radio access technology of the another cell to provide to the at least one user equipment a timing and periodicity of system information messages broadcast in the another cell; wherein providing the at least one system information message is performed one of before or after a handover of the at least one user equipment to the another cell; wherein the at least one control message is prioritizing in response at the cell paging message responses to at least one of a high reliability service or low latency service; and/or wherein the specific services comprises at least one of high reliability services or low latency services; wherein the specific services comprises voice call services.

A non-transitory computer-readable medium storing program code, the program code executed by at least one processor to perform at least the method as described in the paragraphs above.

In another example aspect of the invention, there is an apparatus comprising: means for determining, by a network device of a cell of a communication network, to accept from another cell of a same or different radio access technology in the communication network an offload of at least one beam of more than one beam associated with at least one user equipment of the another cell; and means, based on the determining, for receiving information comprising at least one control message identifying the at least one beam associated with the at least one user equipment offload from the another cell.

In accordance with the example embodiments as described in the paragraph above, at least the means for determining and receiving comprises a network interface, and computer program code stored on a computer-readable medium and executed by at least one processor.

A further example embodiment is an apparatus comprising the apparatus of the previous paragraphs, wherein the connection is using an X2 and/or Xn interface; wherein the information comprises at least one information block configured with the at least one control message for broadcasting towards the at least one user equipment to at least identify to the at least one user equipment the at least one beam for the offload; wherein the at least one control message is identifying a cells radio access technology, frequency, timing acquisition, and/or at least one new information element associated with acquisition of said information; wherein there is means for broadcasting towards the at least one user equipment information comprising the at least one information block, wherein the at least one control message of the at least one information block is for at least one paging message associated with the at least one user equipment, and wherein the at least one control message is to allow the at least one user equipment to respond to paging messages of the at least one paging message which are for certain types of service in the another cell; wherein there is means for providing to the at least one user equipment information comprising at least a channel frequency and radio access technology of the another cell for the offload; and based on the information, means for synching with the at least one user equipment on the radio access technology of the another cell to provide to the at least one user equipment a timing and periodicity of system information messages broadcast in the another cell; wherein providing the information is performed one of before or after a handover of the at least one user equipment to the another cell; wherein the at least one control message is prioritizing in response at the cell paging message responses to at least one of a high reliability service or low latency service which can comprise a voice call; wherein the at least one information block comprises at least one of a master information block or system information block; wherein the at least one control message of the at least one information block is for at least one of a paging message or System information message associated with the at least one user equipment, and wherein the at least one control message is to allow the at least one user equipment to receive only paging messages of the at least one paging message or System Information message which are for certain types of service in the another cell; and/or wherein the determining comprises: determining to accept the offload from the another cell; and based on the acceptance, means for setting up with the another cell a connection for receiving the information; wherein the at least one control message of the at least one information block is for at least one system information message associated with the at least one user equipment; wherein the at least one control message to allow the at least one user equipment to receive system information messages which are for certain types of service in the another cell, such as for example specific services; wherein the specific services comprises at least one of high reliability services or low latency services, wherein the specific services comprises voice call services; wherein there is providing to the at least one user equipment information comprising at least a channel frequency and radio access technology of the another cell for the offload; and based on the information, synching with the at least one user equipment on the radio access technology of the another cell to provide to the at least one user equipment a timing and periodicity of system information messages broadcast in the another cell; wherein providing the at least one system information message is performed one of before or after a handover of the at least one user equipment to the another cell; wherein the at least one control message is prioritizing in response at the cell paging message responses to at least one of a high reliability service or low latency service; and/or wherein the specific services comprises at least one of high reliability services or low latency services; wherein the specific services comprises voice call services.

In another example aspect of the invention, there is an apparatus, such as a user equipment side apparatus, comprising: at least one processor; and at least one memory including computer program code, where the at least one memory and the computer program code are configured, with the at least one processor, to cause the apparatus to at least: receive, by user equipment of a cell of a communication network, from another cell of a same or different radio access technology information comprising at least one control message identifying at least one beam of more than one beam from another network for the user equipment. Then determine the at least one beam offloaded from the another cell from the cell to receive the at least one control message by the user equipment.

In accordance with example aspects of the invention there is at least a method comprising: receiving, by user equipment of a cell of a communication network, from another cell of a same or different radio access technology information comprising at least one control message identifying at least one beam of more than one beam from another network for the user equipment. Then, based on the information, determining the at least one beam offloaded from the another cell from the cell to receive the at least one control message by the user equipment.

A further example embodiment is a method comprising the method of the previous paragraph, wherein the information comprises at least one information block configured with the at least one control message for enabling the at least one user equipment to identify the at least one beam for the offload; wherein the at least one control message is identifying the cell where the at least one beam is offloaded to.

In accordance with the example embodiments as described in the paragraphs above, wherein the at least one control message is for at least one paging message associated with the at least one user equipment, and wherein the at least one control message is identifying to the user equipment another cell where the at least one paging message was forwarded and directs the user equipment to the another cell; wherein the at least one control message is informing the user equipment, based on at least one of a cause or a priority of the at least one paging message, a cell of the communication network that the at least one user equipment should respond to; wherein there is based on the informing, determining by the user equipment information comprising at least a channel frequency and radio access technology of the another cell for the offload; and based on the information, synching with the another cell or another different cell based on the radio access technology of the another cell to acquire a timing and periodicity of system information messages broadcast in the another cell; wherein the determining the information is performed one of before or after a handover of the user equipment to the another cell; wherein the at least one control message is indicating an allowance of the user equipment to respond to paging messages of the at least one paging message which are for certain types of service in the another cell; wherein the user equipment is camped on the another cell and wherein the user equipment acquires the at least one control message while the user equipment is in an idle mode; wherein the at least one control message is indicating a prioritization at the cell of paging message responses to at least one of a high reliability service or low latency service which can comprise a voice call; wherein the at least one information block comprises at least one of a master information block or system information block; wherein the at least one control message is for at least one paging message or system information message associated with the user equipment, and wherein the at least one control message is identifying to the user equipment another cell where the at least one paging message was forwarded and directs the user equipment to the another cell; wherein the at least one control message is for at least one system information message associated with the at least one user equipment, and wherein the at least one control message is identifying to the user equipment another cell where the at least one system information message was forwarded and directs the user equipment to the another cell; wherein the at least one control message is informing the user equipment, based on at least one of a cause or a priority of the at least one system information message, a cell of the communication network that the at least one user equipment is to receive system information messages; wherein there is based on the informing, determining by the user equipment information comprising at least a channel frequency and radio access technology of the another cell for the offload; and based on the information, synching with the another cell base or another different cell on the radio access technology of the another cell or the another different cell to acquire a timing and periodicity of system information messages broadcast in the another cell or the another different cell; wherein the determining the information is performed one of before or after a handover of the user equipment to the another cell; wherein the at least one control message is indicating an allowance of the user equipment to receive system information messages of the at least one system information message which are for certain types of service in the another cell or different cell; wherein the user equipment is camped on the another cell and wherein the user equipment acquires the at least one control message while the user equipment is in an idle mode; wherein the at least one control message is indicating a prioritization at the cell of the at least one system information message responses to specific services; wherein the specific services comprises at least one of high reliability services or low latency services; and/or wherein the specific services comprises voice call services.

A non-transitory computer-readable medium storing program code, the program code executed by at least one processor to perform at least the method as described in the paragraphs above.

In another example aspect of the invention, there is an apparatus comprising: means for receiving, by user equipment of a cell of a communication network, from another cell of a same or different radio access technology information comprising at least one control message identifying at least one beam of more than one beam from another network for the user equipment. Then, based on the information, determining the at least one beam offloaded from the another cell from the cell to receive the at least one control message by the user equipment.

In accordance with the example embodiments as described in the paragraph above, at least the means for receiving and determining comprises a network interface, and computer program code stored on a computer-readable medium and executed by at least one processor.

A communication system comprising the network side apparatus and the user equipment side apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 13 shows MIB parameters relates to SIB1 in accordance with an example embodiment of the invention;

FIG. 14 shows KSSB Reserved values;

DETAILED DESCRIPTION

In this invention, there is proposed at least a method and apparatus enabling offload of paging messages and/or system information messages for certain beams between different cells which may be applying different radio access technologies.

As indicated above LTE-NR Dynamic Spectrum Sharing (DSS) was introduced in 3GPP Rel15 as a framework to enable smooth spectrum migration from one RAT technology to another. DSS allows for progressive resource(frequency) dedication to NR, as NR device penetration increases. Also that initial DSS deployments are based on ENDC architectures and one next step can be to enable NR DSS cells to operate in standalone mode i.e., as a Pcell.

Example embodiments of the invention as disclosed herein work to provide improvements for at least similar operations.

There are scenarios where a serving cell may be limited in control channel capacity (PDCCH). When a serving cell acts as a PCell, it has to broadcast SIB, paging and other messages over its common control channels. When PDCCH resources in the serving cell are scarce this impacts the scheduling of user plane and other control plane traffic.

Figure 1:
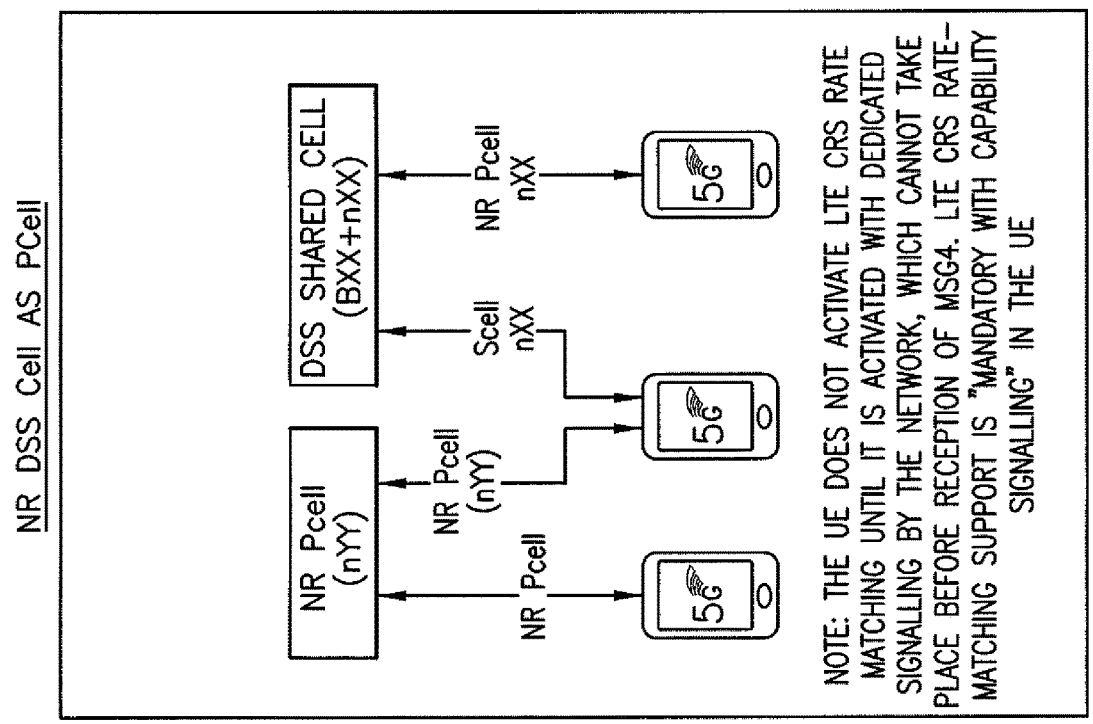
FIG. 1 shows an LTE-NR DSS.

FIG. 1 shows such an example scenario with LTE-NR DSS. The current DSS framework adopted by the ecosystem is mostly based on CRS rate matching and this leads to having only one NR PDCCH symbol in a slot when 4 port LTE CRS is assumed. The 3GPP specs do allow for more NR PDCCH symbols in a slot, however this would lead to reduced PDSCH capacity and requirements for UE to support optional features which are not supported as of today.

It is noted example embodiments of the invention as disclosed herein can be expanded outside the scope of LTE-NR DSS to also allow for offloading of the paging procedure for higher frequency bands for example. Please see more use cases in the detailed description section.

With a single NR PDCCH in a slot, in a 10 MHz cell only 8CCEs are available and this allows to schedule a single cell edge user in the DL or UL but not both simultaneously. It would be beneficial to offload the scheduling of control messages which are typically scheduled with a high number of CCEs to ensure high decoding probability at cell edge.

Regarding one invention associated with these operations there is targeted for UE-UE side link paging. In this side link paging a paging message can be forwarded from one node to another, however here there are provided no details on how the paging is forwarded to how the association between the BTS and UE are established to decode the forwarded paging. This operation also does not provide details on how a UE would decide on which cell to monitor its paging on and does not cover partial or total offloading of paging broadcasting from one cell to another.

Figure 2:
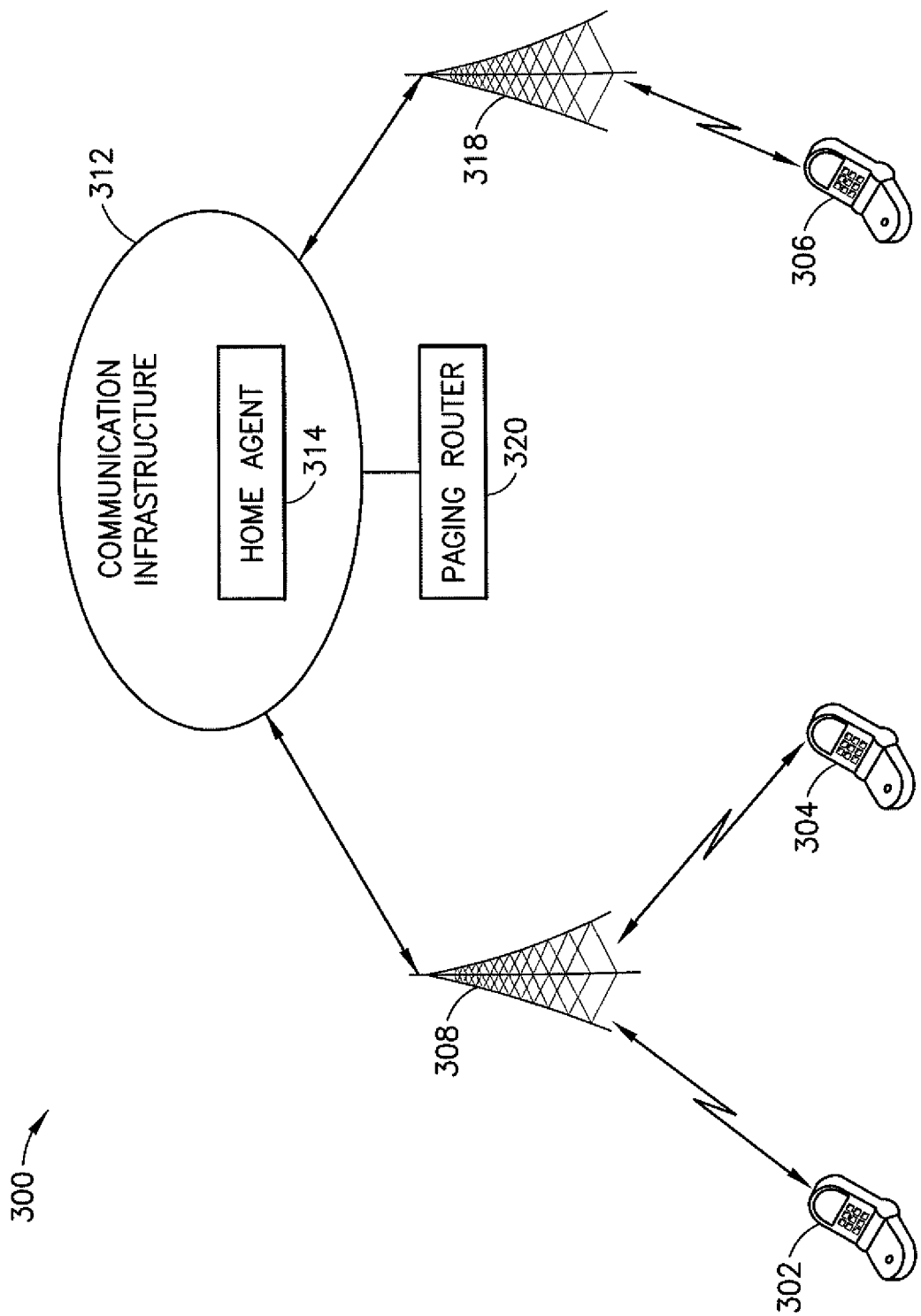
FIG. 2 shows a prior art diagram for page forwarding.

FIG. 2 shows a prior art diagram for page forwarding. It is noted that some of the claims of this application on SI and/or paging forwarding can be related to FIG. 2.

In one proposal at the time of this application a communication infrastructure can route the paging message to the target wireless terminal by any number of different infrastructure nodes. Alternatively, if the target wireless terminal is in the vicinity of the base station 308 or 310 as shown in FIG. 2, the paging message router 320 can transmit the paging message directly to the target wireless terminal (e.g., needs to communicate the paging message to the infrastructure network). There is no need to pass through different infrastructure nodes.

As shown in FIG. 2 the system 300 includes any number of wireless terminals (e.g., wireless terminals 302, 304, 306, . . . ), Any number of base stations (e.g., base stations 308, 310, . . . ), And communication infrastructure 312. (For example, an infrastructure network, a wide area network, . . . ). Wireless terminals 302 and 304 may be within the service area of base station 308, and wireless terminal 306 may be within the coverage area of base station 310. Base stations 308-310 can be coupled via communication infrastructure 312. During periods of low traffic activity, the wireless terminals 302-306 can enter a low power mode (e.g., sleep state) to conserve power. Wireless terminals 302-306 need not listen and decode each peer-to-peer traffic request during a low power state. Prior to establishing direct peer-to-peer communication with each other, wireless terminals 302-306 can page each other to wake each other from a low power state. Note that each wireless terminal 302-306 may continue to monitor the corresponding base station 308-310's paging channel for possible next paging messages.

Communication infrastructure 312 may include a home agent 314 associated with wireless terminal 306. The home agent 314 can track the location of the target wireless terminal 306 (e.g., the home agent 314 can identify that the wireless terminal 306 is associated with the base station 310). Further, the home agent 314 can enable routing of paging messages via the communication infrastructure 312 to the base station 310 associated with the target wireless terminal 306. The home agent 314 can track one or more wireless terminals 302-306, and the communication infrastructure 312 can include any number of home agents similar to the home agent 314. Upon receiving the paging message, the base station 310 can transmit the paging message to the target wireless terminal 306.

Figure 3:
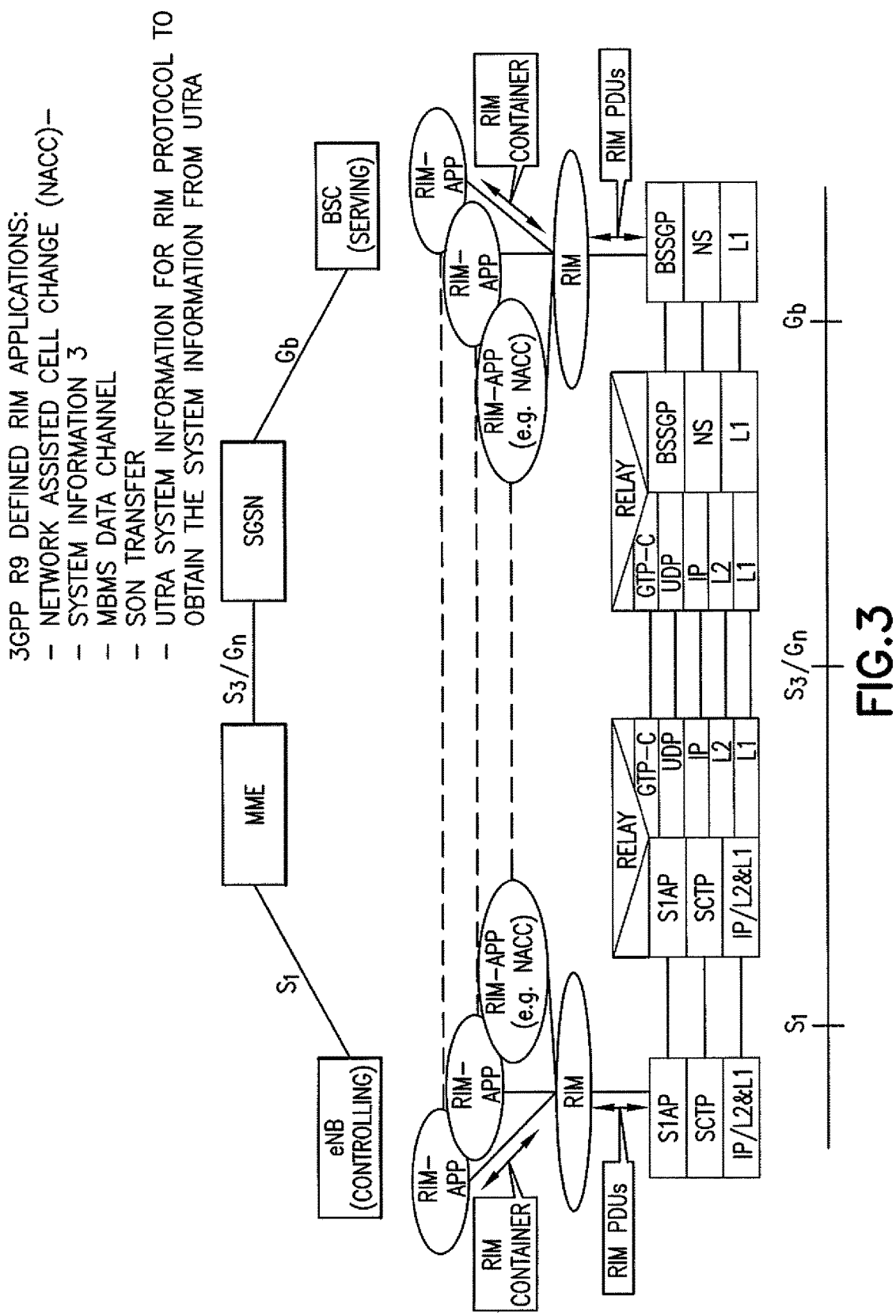
FIG. 3 shows RAN information management.

In addition there is discussed a 3GPP based RAN Information Management. FIG. 3 shows RAN information management. FIG. 3 illustrates another proposal including a system 300 that forwards paging messages between wireless terminals to initiate direct peer-to-peer communication where paging messages can be forwarded via an infrastructure-based paging mechanism.

However, in this method the exchanging System Information does not direct forwarding from one BTS to another and System Information of another node is not broadcast in the receiving cell. The information exchanged was either used to populate fields in the System Information messages of the serving cell or it was relayed to the UE over dedicated signalizing e.g., RRC release during CSFB.

It is noted that this does not include broadcasting System Information messages of another node/RAT on different node i.e., a UE would not be able to acquire 2G SIBs from LTE cell. Thus, this does not include broadcasting System Information messages of another node/RAT on different node i.e., a UE would not be able to acquire 2G SIBs from LTE cell.

Figure 4:
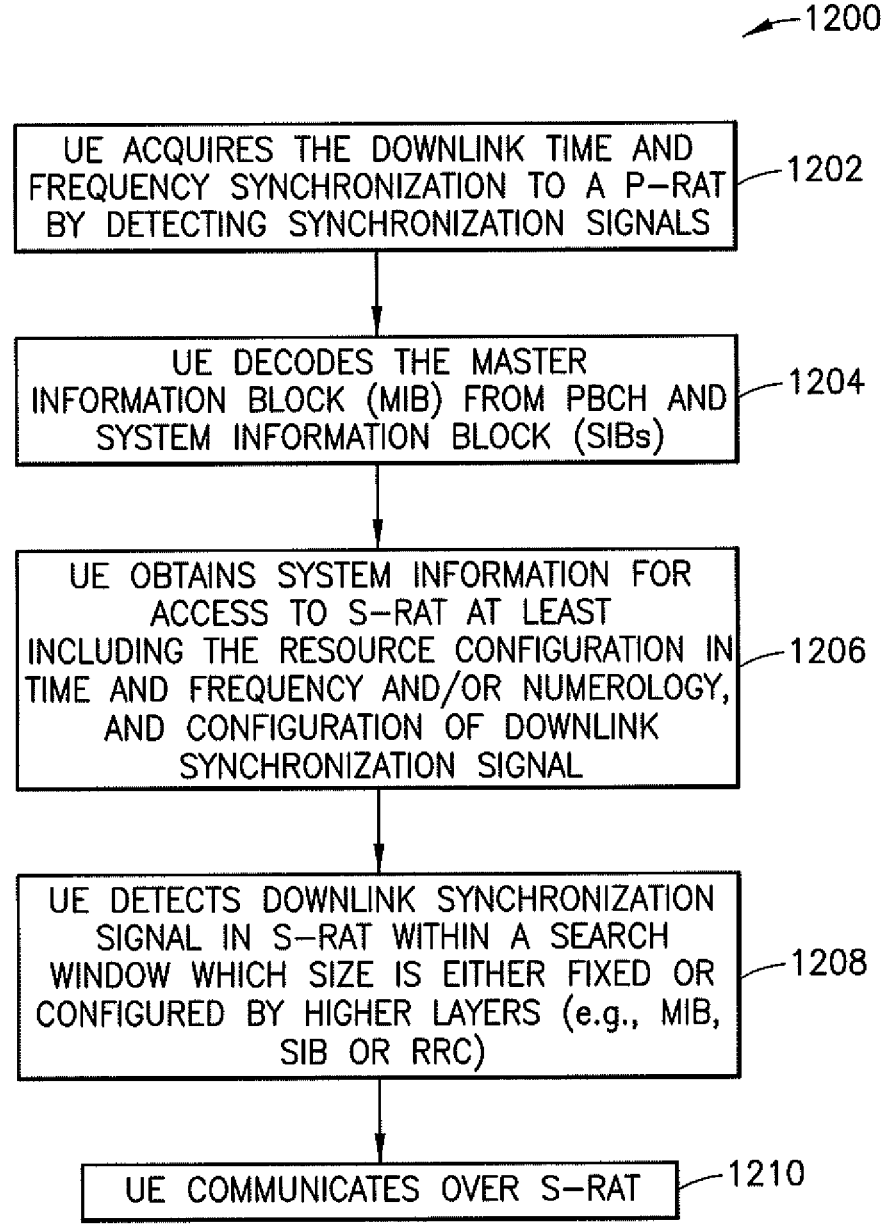
FIG. 4 shows prior art Cross RAT scheduling.

In another proposal associated with the above operations there is enabled cross RAT scheduling but requires the UE to decode the System Information in each RAT, see underlined text below and FIG. 4. FIG. 4 shows prior art Cross RAT scheduling.

When a serving cell acts as a PCell, it must broadcast SIB, paging and other messages over its common control channels. When PDCCH resources in the serving cell are scarce this impacts the scheduling of user plane and other control plane traffic. One example of such scenario is LTE-NR DSS. The current DSS framework is based on CRS rate matching. When 4 port LTE CRS is assumed only one NR PDCCH symbol is available in a slot. 3GPP allows more NR PDCCH symbols in a slot, however this would lead to reduced PDSCH capacity and requirements for UE to support optional features. With a single NR PDCCH in a slot, only 8CCEs are available in a 10 MHz cell. This allows to schedule a single cell edge user in the DL or UL but not both simultaneously.

Certain example embodiments of the invention relates to LTE-NR Dynamic Spectrum Sharing (DSS), which was introduced to enable smooth spectrum migration from one RAT technology to another.

Initial DSS deployments are based on ENDC architectures but the next step is to enable NR DSS cells to operate in standalone mode i.e., as a Pcell.

The problem to be solved is when a serving cell acts as a PCell, it has to broadcast SIB, system information messages, paging, and/or other messages over or using its common control channels. With DSS framework at the time of this application only one NR PDCCH symbol in a slot is available when 4 port LTE CRS is assumed, even 3GPP allows more, but this would lead to reduced PDSCH capacity and requirements for UE to support optional features. To solve the problem certain example embodiments of the invention provide at least a method and apparatus to enable a serving cell of any RAT to offload the broadcasting of its system information messages or its paging messages to another cell of the same or different RAT.

As indicated in this application, user equipment and base stations can enable access to secondary radio access technology (S-RAT), a cross radio access technology (RAT) scheduling between a primary RAT (P-RAT) and a secondary RAT (S-RAT) and/or cross-scheduling in a same RAT with different optimizations and use/partition for different applications (e.g., a regular partition with a carrier resource (referred to as P-RAT) and an additional resource partition/region for device-to-device (D2D) or machine-type-communication (MTC) application (referred to as S-RAT)). Cross-RAT/partition-scheduling can include when 5-RAT is scheduled by P-RAT or when P-RAT is scheduled by S-RAT.

In an access example, a UE acquires the downlink time and frequency synchronization to a P-RAT by detecting synchronization signals, e.g., PSS/SSS from P-RAT and then decodes the master information block (MIB) from physical broadcast channel (PBCH) and system information block (SIBs). After successful decoding of MIB or SIB on P-RAT, the UE obtains system information for access to S-RAT at least including the resource configuration in time and frequency (e.g., DL bandwidth, antenna configuration information, multicast-broadcast single-frequency network (MBSFN) configuration, frame structure configuration, absolute radio-frequency channel number (ARFCN) value to indicate the frequency of S-RAT etc.), and/or numerology, and configuration of downlink synchronization signal. The UE detects downlink synchronization signal in S-RAT within a search window which size is either fixed or configured by higher layers and then communicates with S-RAT.

In a scheduling example, when S-RAT is scheduled by P-RAT, two options can be considered for the DL cross-RAT scheduling: Cross-RAT scheduling or Cross-RAT-TTI scheduling. For cross-RAT scheduling, flexible access technology (FAT) physical downlink shared channel (PDSCH) (F-PDSCH) on S-RAT is transmitted within the same transmission time interval (TTI) when FAT physical downlink control channel (F-PDCCH) is transmitted on P-RAT. For cross-RAT-TTI scheduling, F-PDSCH on S-RAT is transmitted K P-TTI after F-PDCCH is transmitted on P-RAT.

The UE of this example is to receive from one of the one or more eNBs scheduling information for the second RAT using the first RAT further to: determine downlink time and frequency synchronization to the first RAT; decode a master information block (MIB) or MIB and system information block (SIB) to determine access information for the second RAT; and detect a downlink synchronization signal within a search window of the second RAT In accordance with an example embodiment of the invention there is performed by a Serving cell of any RAT offloading the broadcasting of its System Information messages to another cell(s) of the same or different RAT. The SI broadcasting offload can be partial or total, e.g., the serving cell may choose to broadcast the SI messages for specific beams and offload the SI messages for other beams to another cell. The invention proposes the methods via which the SI can be forwarded from one node to another and how inform the UE on which cell to receive its SI messages in Idle mode and connected mode.

In accordance with another example embodiment of the invention a Serving cell of any RAT is enabled to offload the broadcasting of its beams, system information messages, and/or paging messages to another cell(s) of the same or different RAT. The SI or paging offload can be partial or total. For example, the serving cell may choose to broadcast at least one SI message for specific beams and/or paging messages for specific beams and offload the SI messages, the paging messages, and/or the certain beams to another cell. The invention proposes the methods via which signaling for these operations can be forwarded from one node to another and how inform the UE on which cell to receive the offload SI, messages, and/or certain beams to another cell.

Figure 15:
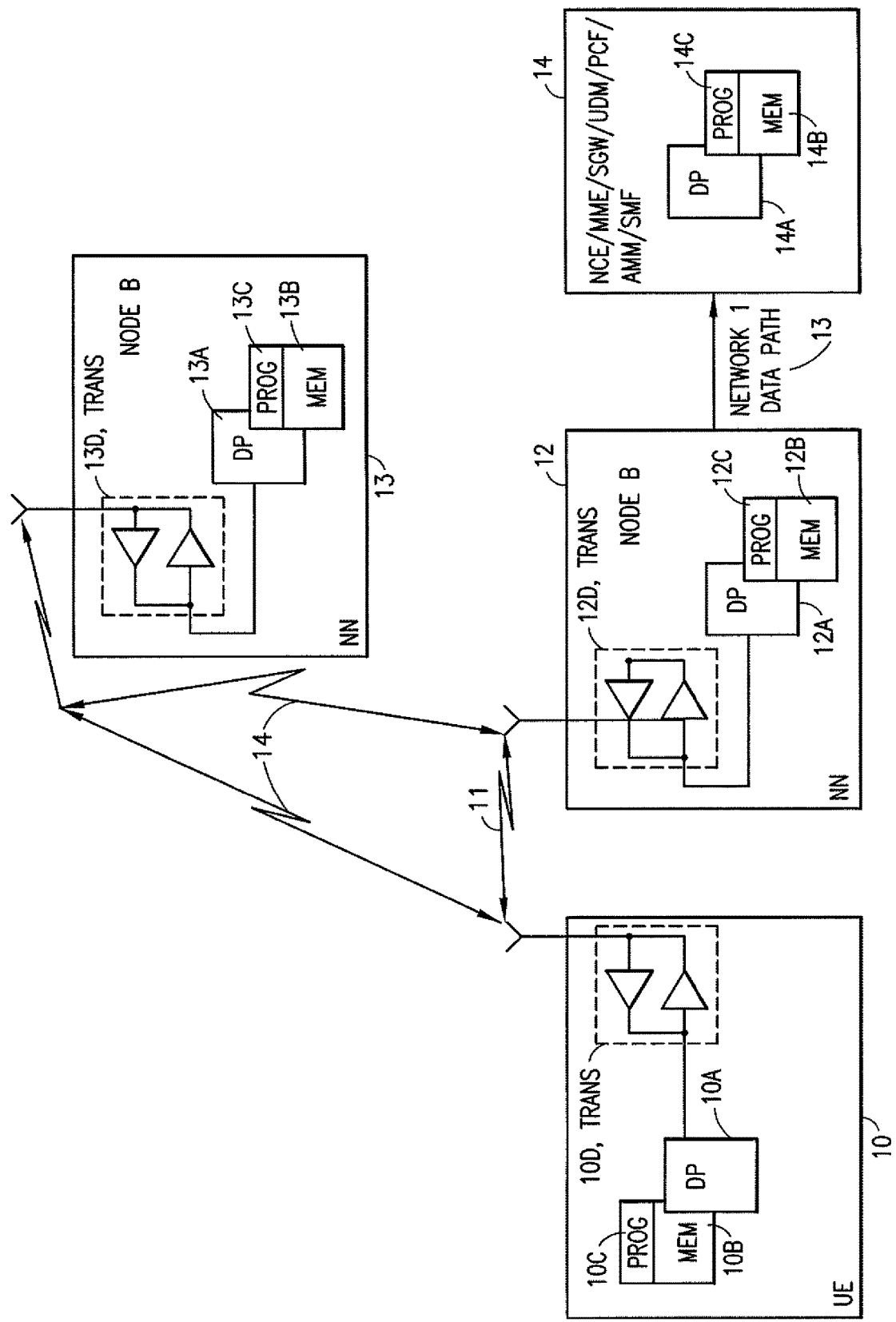
FIG. 15 shows a high level block diagram of various devices used in carrying out various aspects of the invention.

Before describing the example embodiments of the invention in detail, reference is made to FIG. 15 for illustrating a simplified block diagram of various electronic devices that are suitable for use in practicing the example embodiments of this invention.

FIG. 15 shows a block diagram of one possible and non-limiting exemplary system in which the example embodiments of the invention may be practiced. In FIG. 1, a user equipment (UE) 10 is in wireless communication with a wireless network 1. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signaling and/or data exchange with the RAN.

The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D are connected to one or more antennas for communication 11 and 18 to NN 12 and NN 13, respectively. The one or more memories MEM 10B include computer program code PROG 10C. The UE 10 communicates with NN 12 and/or NN 13 via a wireless link 111.

The NN 12 (NR/5G Node B, an evolved NB, or LTE device) is a network node such as a master or secondary node base station (e.g., for NR or LTE long term evolution) that communicates with devices such as NN 13 and UE 10 of FIG. 1. The NN 12 provides access to wireless devices such as the UE 10 to the wireless network 1. The NN 12 includes one or more processors DP 12A, one or more memories MEM 12C, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D are connected to one or more antennas for communication over at least link 11 with the UE 10. The one or more memories MEM 12B and the computer program code PROG 12C are configured to cause, with the one or more processors DP 12A, the NN 12 to perform one or more of the operations as described herein. The NN 12 may communicate with another gNB or eNB, or a device such as the NN 13. Further, the link 11 and or any other link may be wired or wireless or both and may implement, e.g., an X2 or Xn interface. Further the link 11 may be through other network devices such as, but not limited to an NCE/SGW/AMF/UPF device such as the NCE/MME/SGW/UDM/PCF/AMM/SMF 14 of FIG. 1. The NN 12 may perform functionalities of an MME (Mobility Management Entity) or SGW (Serving Gateway), such as a User Plane Functionality, and/or an Access Management functionality for LTE and similar functionality for 5G The NN 13 can comprise a mobility function device such as an AMF or SMF, further the NN 13 may comprise a NR/5G Node B or possibly an evolved NB a base station such as a master or secondary node base station (e.g., for NR or LTE long term evolution) that communicates with devices such as the NN 12 and/or UE 10 and/or the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the NN 12 and the UE 10 or any other device using, e.g., link 11 or another link. These links maybe wired or wireless or both and may implement, e.g., an X2 and/or Xn interface. Further, as stated above the link 11 may be through other network devices such as, but not limited to an NCE/MME/SGW device such as the NCE/MME/SGW/UDM/PCF/AMM/SMF 14 of FIG. 1.

The one or more buses of the device of FIG. 15 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the NN 12 being physically in a different location from the RRH, and the one or more buses 157 could be implemented in part as fiber optic cable to connect the other elements of the NN 12 to a RRH.

It is noted that although FIG. 15 shows a network nodes Such as NN 12 and NN 13. Any of these nodes may can incorporate or be incorporated into an eNodeB or eNB or gNB such as for LTE and NR, and would still be configurable to perform example embodiments of the invention.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 may include a NCE/MME/SGW/UDM/PCF/AMM/SMF 14 that may include (NCE) network control element functionality, MME (Mobility Management Entity)/SGW (Serving Gateway) functionality, and/or serving gateway (SGW) 190, and/or MME (Mobility Management Entity) and/or SGW (Serving Gateway) functionality, and/or user data management functionality (UDM), and/or PCF (Policy Control) functionality, and/or Access and Mobility Management (AMM) functionality, and/or Session Management (SMF) functionality, and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF 190 is configurable to perform operations in accordance with example embodiments of the invention in any of an LTE, NR, 5G and/or any standards based communication technologies being performed or discussed at the time of this application. In addition, it is noted that the operations in accordance with example embodiments of the invention, as performed by the NN 12 and/or NN 13, may also be performed at the NCE/MME/SGW/UDM/PCF/AMM/SMF 14.

The NCE/MME/SGW/UDM/PCF/AMM/SMF 14 includes one or more processors DP 14A, one or more memories MEM 14B, and one or more network interfaces (N/W I/F(s)), interconnected through one or more buses coupled with the link 13 and/or 14. In accordance with the example embodiments these network interfaces can include X2 and/or Xn interfaces for use to perform the example embodiments of the invention. The one or more memories MEM 14B include computer program code PROG 14C. The one or more memories MEM14B and the computer program code PROG 14C are configured to, with the one or more processors DP 14A, cause the NCE/MME/SGW/UDM/PCF/AMM/SMF 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, and/or DP14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP10, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, and DP14A may be means for performing functions, such as controlling the UE 10, NN 12, NN 13, and other functions as described herein.

Regarding operations in accordance with example embodiments of the invention for offloading at least paging messages at least the text below provides some operations in accordance with example embodiments of the invention.

SIB Offload

In accordance with an example embodiment of the invention SIB messages can be directly forwarded between the BTSs of the serving cell and Cross SIB Cell via e.g., the X2 or the Xn procedure.

Figure 5A:
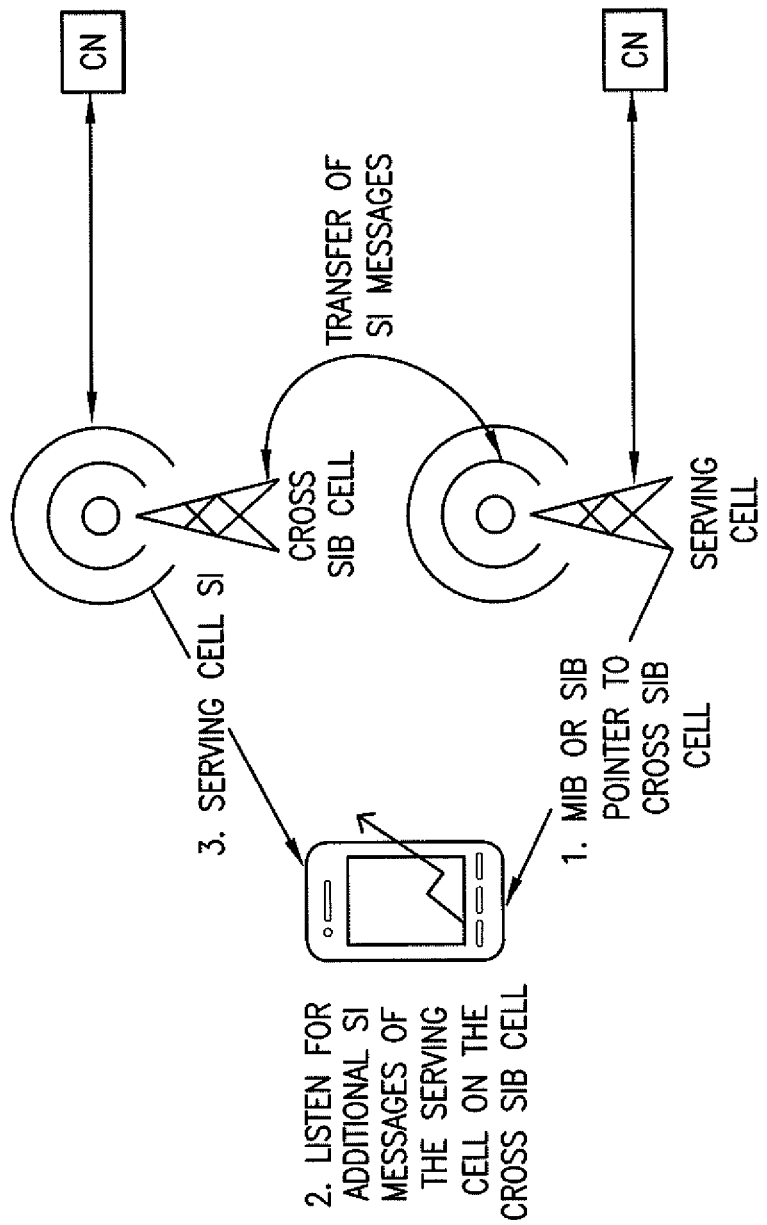
FIG. 5A shows an example of a Cross SIB Cell Architecture.

Some of the text herein shows operations associated with FIG. 5A. FIG. 5A shows an example of a Cross SIB Cell Architecture in accordance with example embodiments of the invention. As shown in FIG. 5 the Cross SIB Cell (FIG. 5A) refers to the cell where the SI is offload. Note that a serving cell could also offload its SI messages to several Cross SIB Cells.

In accordance with example embodiments of the invention UE shall be able to identify which SI messages of its serving cell are offloaded and the Cross SIB Cell via the MIB or SIB of the serving cell. The MIB/SIB of the serving cell shall identify the Cross SIB Cell(s) where the SI broadcasting is offloaded and direct the UE to a single Cross SIB Cell. In idle mode the UE shall acquire the needed SI messages from the Cross SIB Cell in the Cross SIB Cell RAT and encoding format. The UE shall follow all idle and connected mode procedures as per the serving cell parameterization. In connected mode the UE may acquire the SI messages which are not broadcasted by the serving cell via 3GPP Release 16 DedicatedSIBRequest procedure or via tuning to the Cross SIB Cell. An example of the message sequence to enable the Cross SIB cell for a DSS scenario is depicted in FIG. 6.

Figure 6:
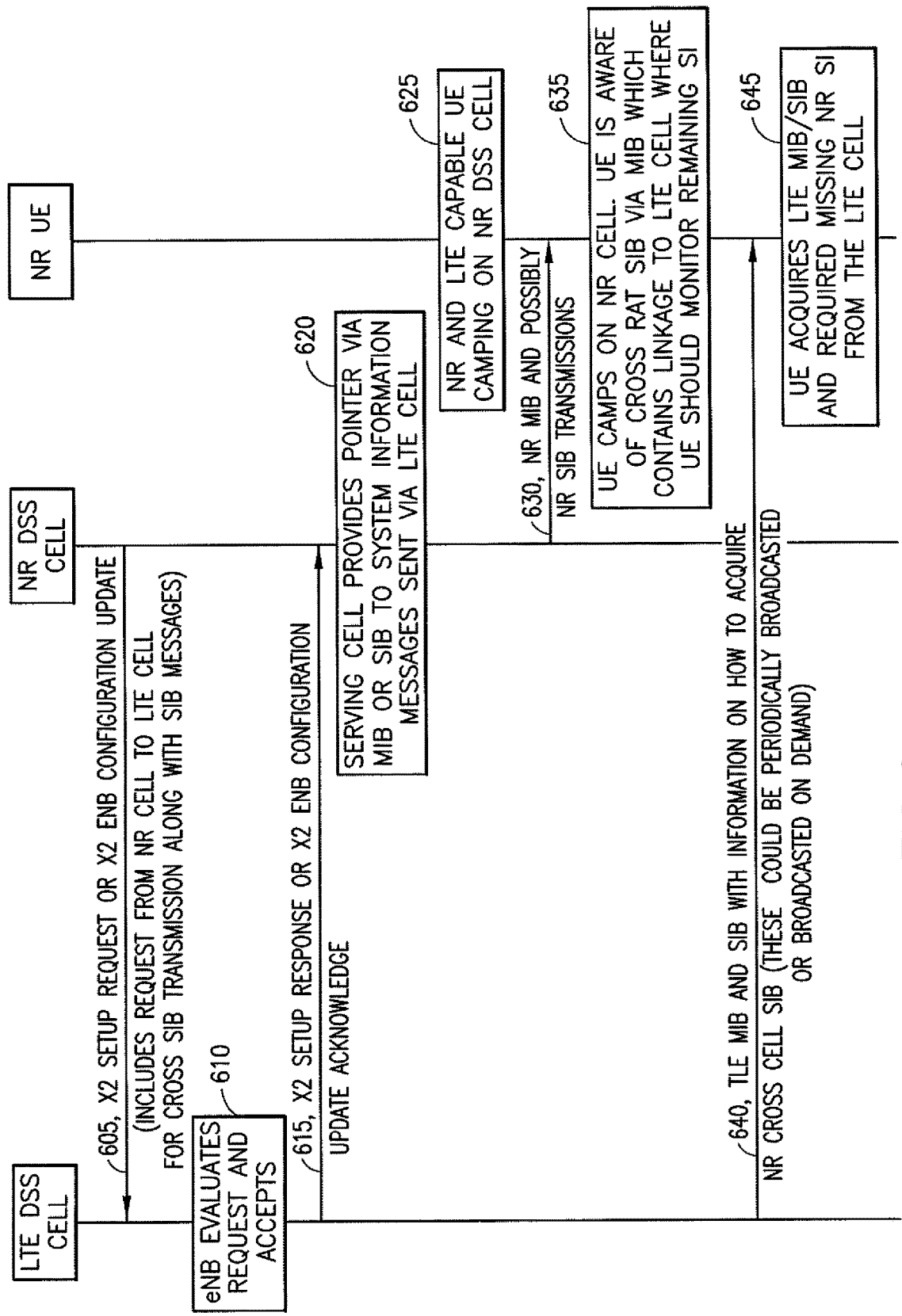
FIG. 6 shows an example of Cross SIB Cell for DSS use cases in accordance with example embodiments of the invention.

FIG. 6 shows an example of Cross SIB Cell for DSS use cases in accordance with example embodiments of the invention. As shown in FIG. 6 there are communications between an LTE DSS Cell, an NR DSS Cell, and an NR UE. In this example the NR DSS Cell can be the serving cell. In step 605 of FIG. 6 there is an X2 setup request or X2 eNB configuration update communicated between the NR DSS Cell to the LTE DSS Cell. In step 610 of FIG. 6 the LTE DSS Cell eNB evaluates the request and accepts. In step 615 of FIG. 6 there is communicated between the LTE DSS Cell and the NR DSS Cell the X2 setup Response or X2 eNB configuration update acknowledge. In step 620 of FIG. 6 the serving cell provides pointer via MIB or SIB to system information messages sent via the LTE cell. As shown in step 625 of FIG. 6 the NR UE is NR and LTE capable and camping on the NR DSS Cell. Then in step 630 of FIG. 6 the NR DSS Cell sends towards the NR UE its NR MIB and possibly NR SIB transmissions. As shown in step 635 of FIG. 6 the NR UE camps on the NR Cell and is aware of cross RAT SIB via MIB which contains linkage to LTE Cell where the UE should monitor remaining SI. As shown in step 640 of FIG. 6 there is communicated between the LTE DSS Cell and the NR UE LTE MIB and SIB with information on how to acquire NR Cross Cell SIB, which may be broadcast on demand. Then as shown in step 645 of FIG. 6 the UE acquires LTE MIB/SIB and required missing NR SI from the LTE Cell.

Figure 7:
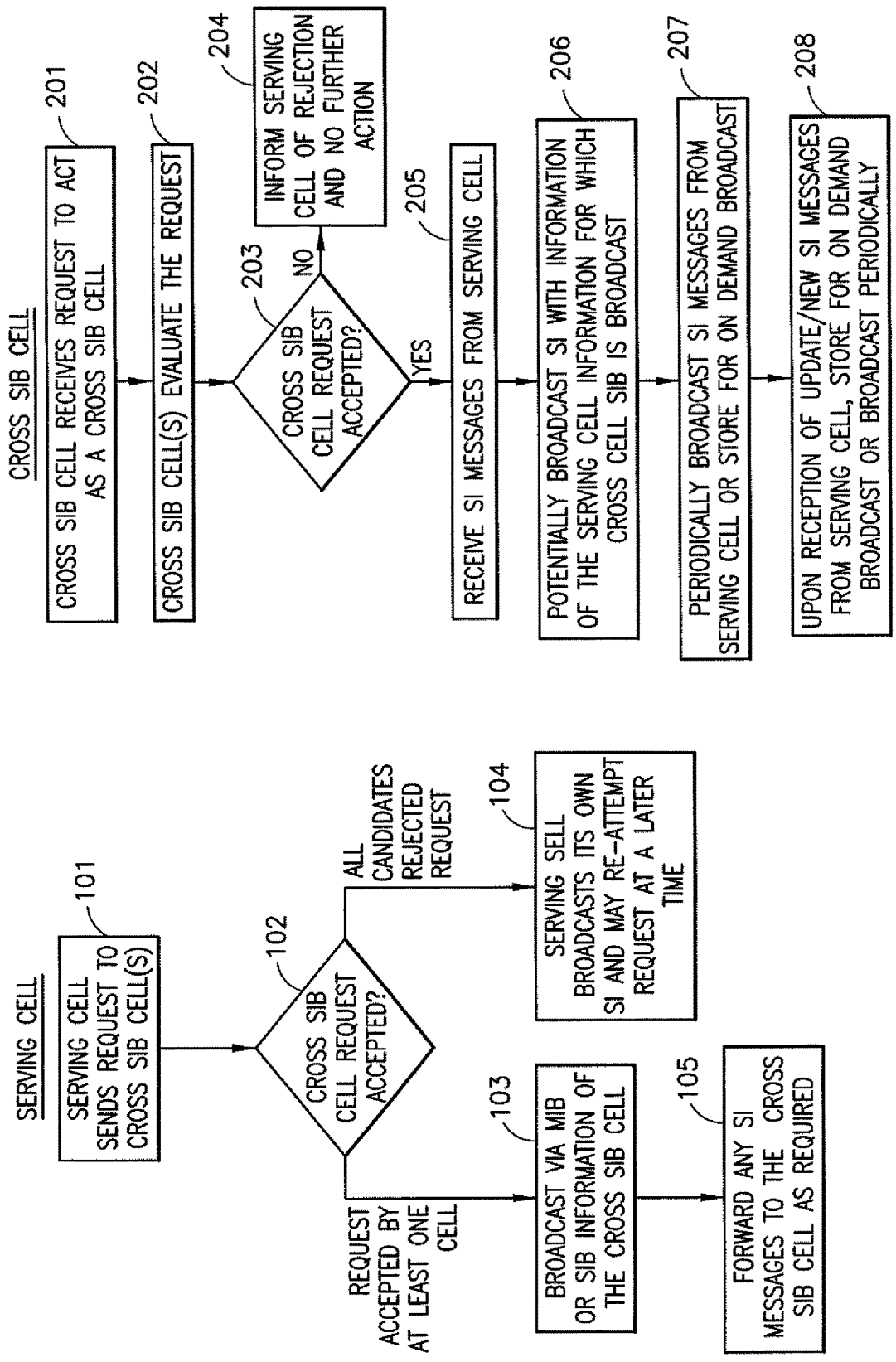
FIG. 7 shows Serving cell and Cross SIB high level flow chart operations in accordance with an example embodiment of the invention.
Figure 8:
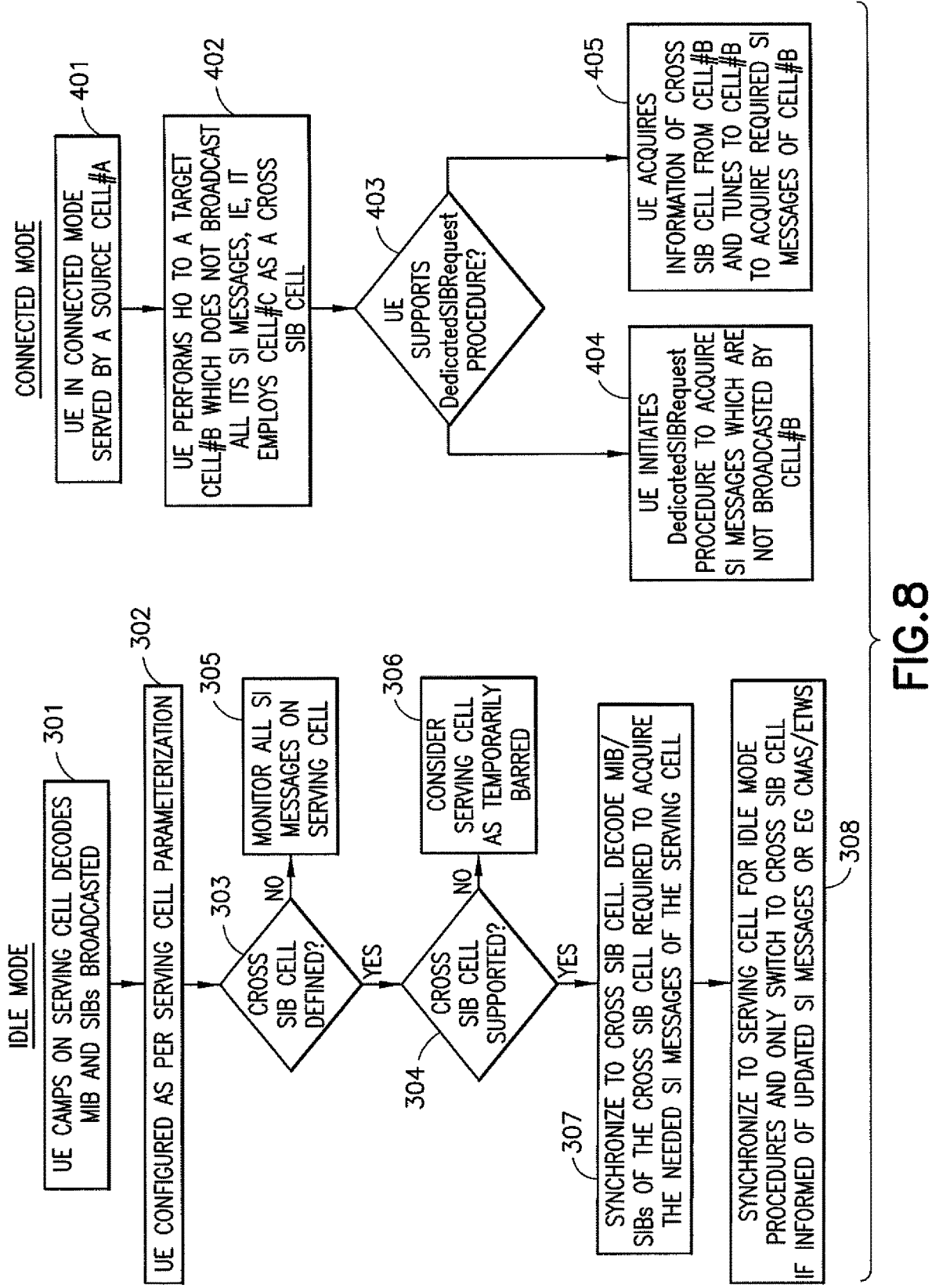
FIG. 8 shows UE Cross SIB Cell flowchart operations in accordance with an example embodiment of the invention.

The cross cell SIB broadcasting can be enabled from the network point of view via the following steps as depicted in FIG. 7. In this regards, the steps are for operations in accordance with example embodiments of the invention and can include:

1. Serving cell sends a request to candidate Cross SIB Cell(s) where it would like to partially or totally off load its SI message broadcast (101/201). This request is performed via e.g., X2/Xn interface. The request may include the SI messages its requesting to deliver, periodicity of these and content of the messages;
2. Candidate Cross SIB cell(s) shall evaluate the request from the Serving cell and decide to accept or reject the request (102/202/203);
3. If the candidate Cross SIB cell(s) reject the request, the serving cell may decide to broadcast its own SIB messages and attempt a request at a later time (104/204);
4. If any of the candidate Cross SIB cell(s) accept the request from the serving cell, the serving cell shall configure its MIB or SIB in order to point UEs to the potential Cross SIB Cells.(103);
5. The serving cell may provide the Cross SIB Cell with the SI message content to be broadcasted along with certain parameterization such as desired periodicity and coding rate (105/205);
6. A Cross SIB cell may include a new IE or SI message to broadcast, to ensure that UEs can uniquely identify the Cross SIB Cell of their serving cell. The Broadcast SI in this scenario would include the identification of the serving cell.(206); and/or
7. The Cross SIB Cell(s) shall either periodically broadcast the SI messages received from the serving cell or broadcast them on demand. The on demand configuration of the Cross SIB Cell may be shared with the serving cell via e.g., X2/Xn procedure (207), if the parameterization for this needs to be broadcast in the serving cell.

In accordance with example embodiments of the invention UE shall be able to identify that the SI messages of its serving cell, which are offloaded to a Cross SIB Cell via the MIB or SIB of the serving cell. The MIB/SIB of the serving cell shall identify the Cross SIB Cell(s) where the SI messages are offloaded and direct the UE to a single Cross SIB Cell. In idle mode the UE shall acquire the needed SI messages from the Cross SIB Cell as needed. The UE shall follow all idle and connected mode procedures as per the serving cell parameterization. In accordance with example embodiments of the invention in a connected mode the UE may acquire the SI messages which are not broadcasted by the serving cell via 3GPP Release 16 DedicatedSIBRequest procedure or via tuning to the Cross SIB Cell.

Cross cell SI broadcasting is enabled from the UE point of view, for idle mode procedures can be via at least the following:

1. UE camping on the Serving cell decodes the MIB or SIB as per normal cell (re)selection procedures (301);
2. The UE shall acquire all SI messages broadcasted from the serving cell. The UE shall follow Idle and connected mode procedures as instructed by the serving cell (302);
3. Based on MIB or SIB, the UE shall identify if some of the serving cells SI messages are offloaded to a Cross SIB Cell and, if so, acquire at least the channel frequency and RAT of the Cross SIB cell(303).
    Note if the UE does not support the RAT, the band or other configuration aspects (bandwidth, numerology, etc) of the Cross SIB Cell, the UE shall consider the serving cell as temporarily barred (304/306);
4. The UE shall synch to the Cross SIB Cell and decode its SI messages to acquire the timing and periodicity of the serving cell SI messages which are broadcast in the Cross SIB Cell. If the MIB or SIB method employed in the serving cell does not uniquely identify the Cross SIB Cell, the Cross SIB Cell may also broadcast an SI message or an IE with the list of serving cells for which it acts as a Cross SIB cell.(307); and/or
5. The UE shall tune to the Cross SIB cell to acquire for SI messages in the Cross SIB Cell RAT format, numerology and waveform as required(308).

Cross cell SI broadcasting impacts on UE behaviour for connected mode procedures are highlighted in FIG. 7. The main difference from typical connected mode handing is during, e.g., HO procedure. After a UE completes a HO to a target cell there are a minimum SI messages it needs to acquire. Depending where the Cross SIB Cell information is sent, i.e., MIB or SIB, UE could be aware of the target cell being a Cross SIB Cell prior to HO execution or after HO completion when for example decoding SIB1. Note that e.g., the Xn interface could be employed for the target cell to inform the source cell, if the target cell employs a Cross SIB Cell. In any case, if the target cell employs a Cross SIB Cell (402), the UE may either request the required SI messages from the target cell after HO completion via the 3GPP Rel16 DedicatedSIBRequest procedure(404) or the UE may need to synch to the Cross SIB Cell to acquire the offloaded SI messages (405).

Paging/Beam Offload

In another example embodiment of the invention there can be a Cross Paging Cell referring to the cell where the paging broadcast of a serving cell is offloaded. Note that a serving cell could also offload its paging messages to several Cross Paging Cells.

An example embodiment of the invention can enable a Serving cell of any RAT to offload the broadcasting of its paging messages to another cell(s) of the same or different RAT. The paging offload can be partial or total e.g., the serving cell may choose to broadcast the paging messages for specific beams and offload the paging messages for other beams to another cell. An example embodiment of the invention provides at least an apparatus and method via which the paging can be forwarded from one node to another and how inform the UE on which cell to receive its paging messages.

Figure 5B:
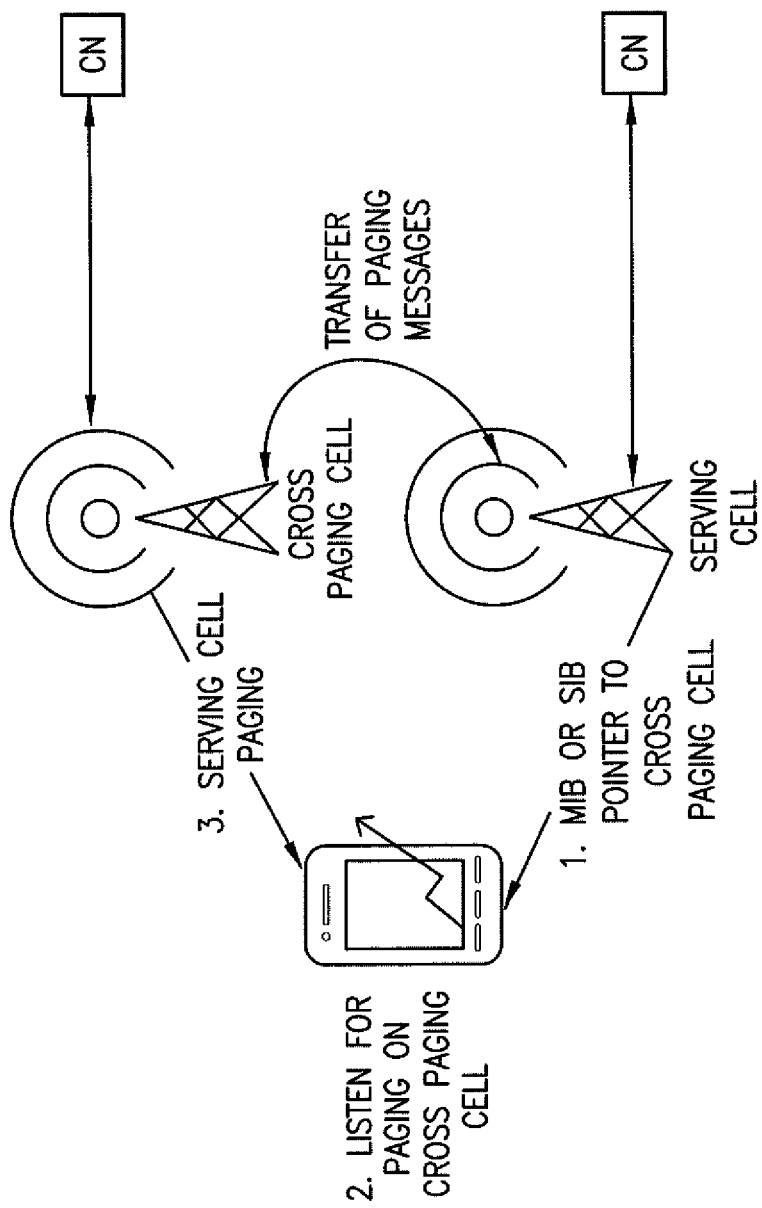
FIG. 5B shows an example of a Cross Paging Architecture.

FIG. 5B shows an example of a Cross Paging Architecture in accordance with example embodiments of the invention. As a note the Cross Paging Cell refers to the cell where the paging broadcast of a serving cell is offloaded. Note that a serving cell could also offload its paging messages to several Cross Paging Cells. As shown in FIG. 5B the Paging messages can be forwarded from core network directly to Cross Paging Cell or it can be forwarded between the BTSs of the serving cell and Cross Paging Cell via e.g., the X2 or the Xn procedure.

In accordance with example embodiments of the invention UE shall be able to identify that the paging of its serving cell is offloaded to a Cross Paging Cell via the MIB or SIB of the serving cell. The MIB/SIB of the serving cell shall identify the Cross Paging Cell(s) where the paging is off-loaded and direct the UE to a single Cross Paging Cell. In idle mode the UE shall monitor the Cross Paging Cell during paging occasions in the Cross Paging Cell RAT format. In accordance with example embodiments of the invention the UE shall follow all idle and connected mode procedures as directed by the serving cell parameterization, and the serving cell may allow UE to respond to paging messages received in the Cross Paging Cell for certain type of services if the UE is registered in the Cross Paging Cell Network. In accordance with example embodiments of the invention the serving cell may also allow for idle to connected mode transitions, which are not in response to a paging message to be initiated in the Cross Paging Cell.

Figure 9A:
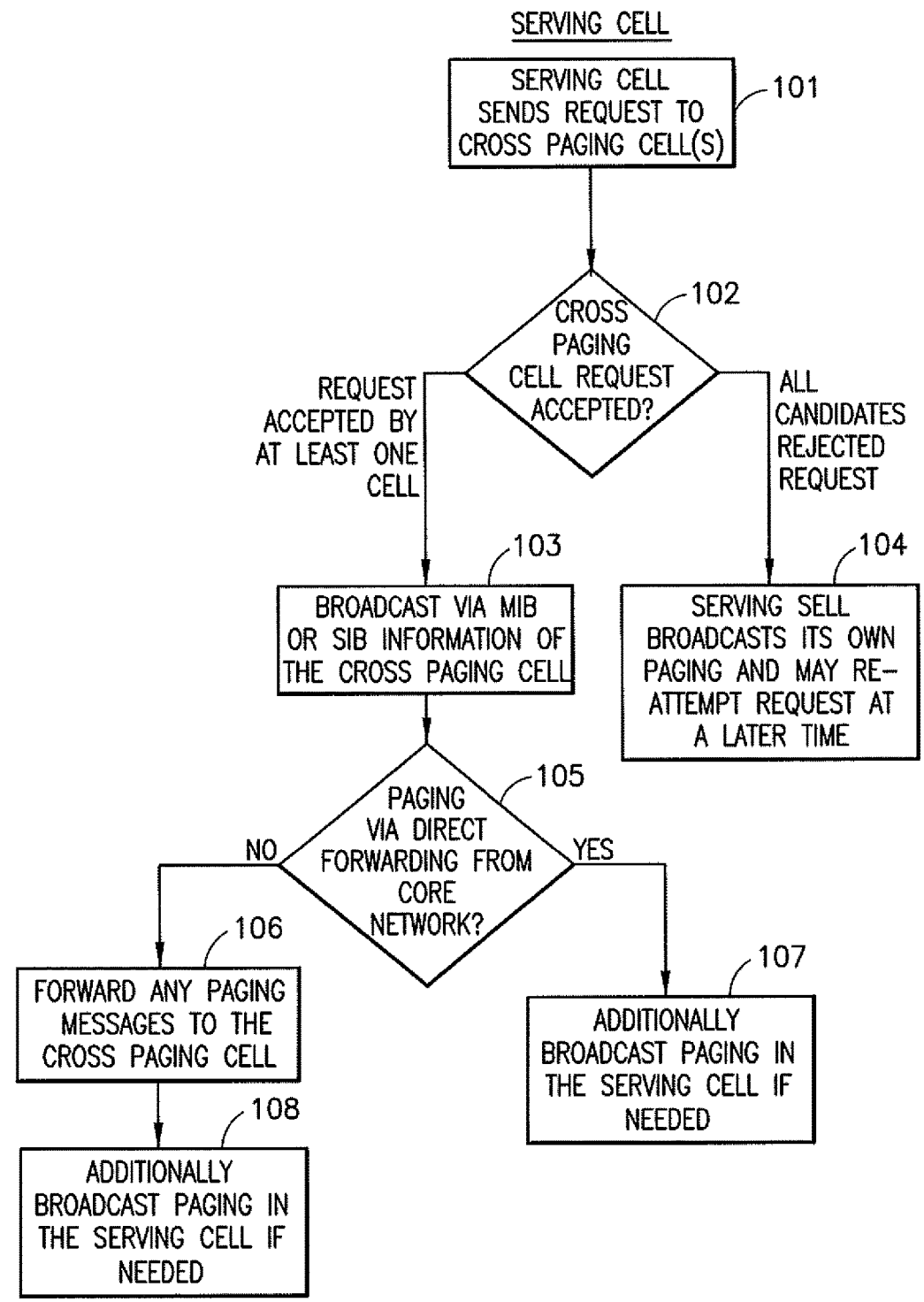
FIG. 9 shows Serving cell and Cross Paging Cell high level flow chart operations in accordance with an example embodiment of the invention.
Figure 9B:
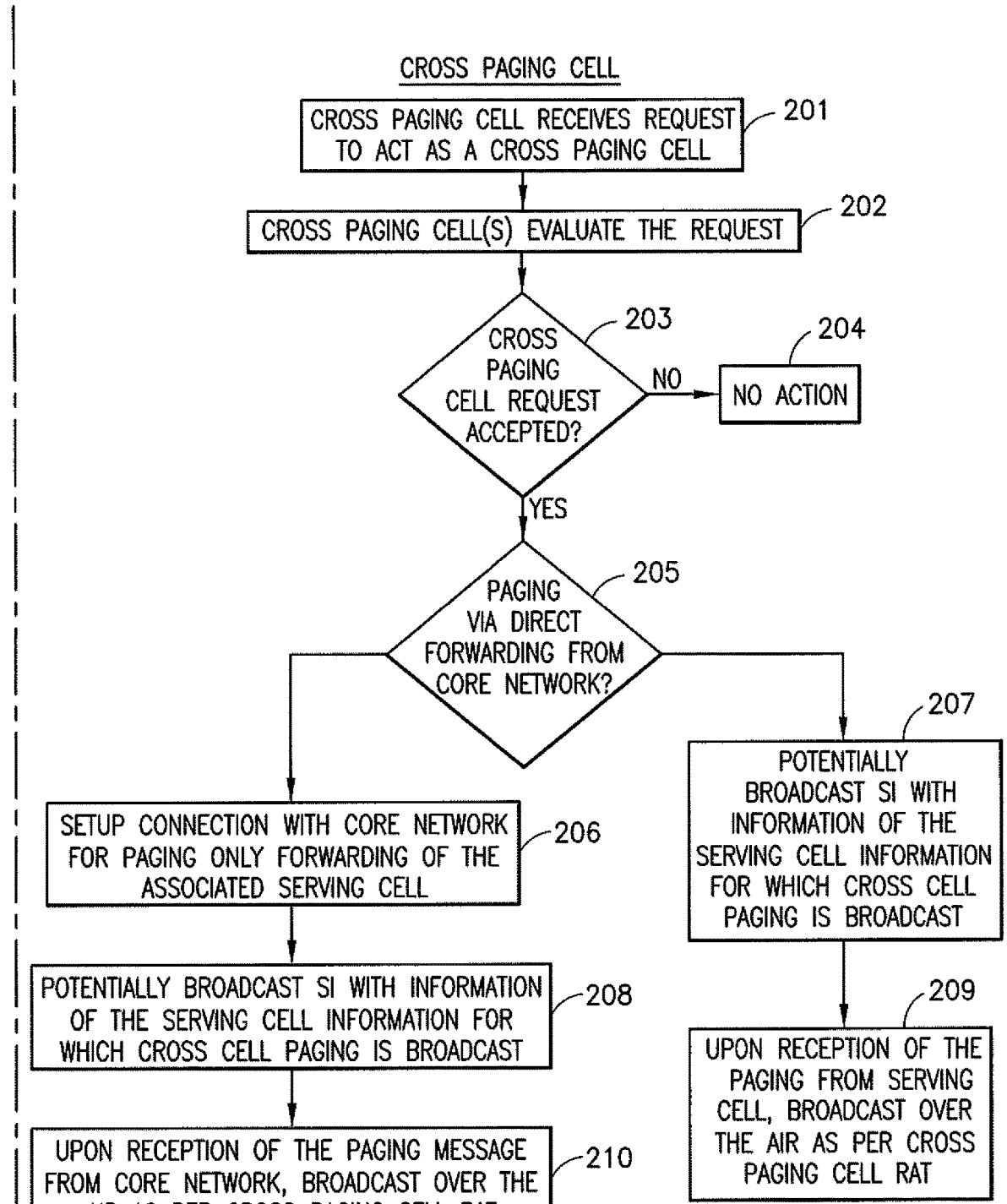
Figure 10:
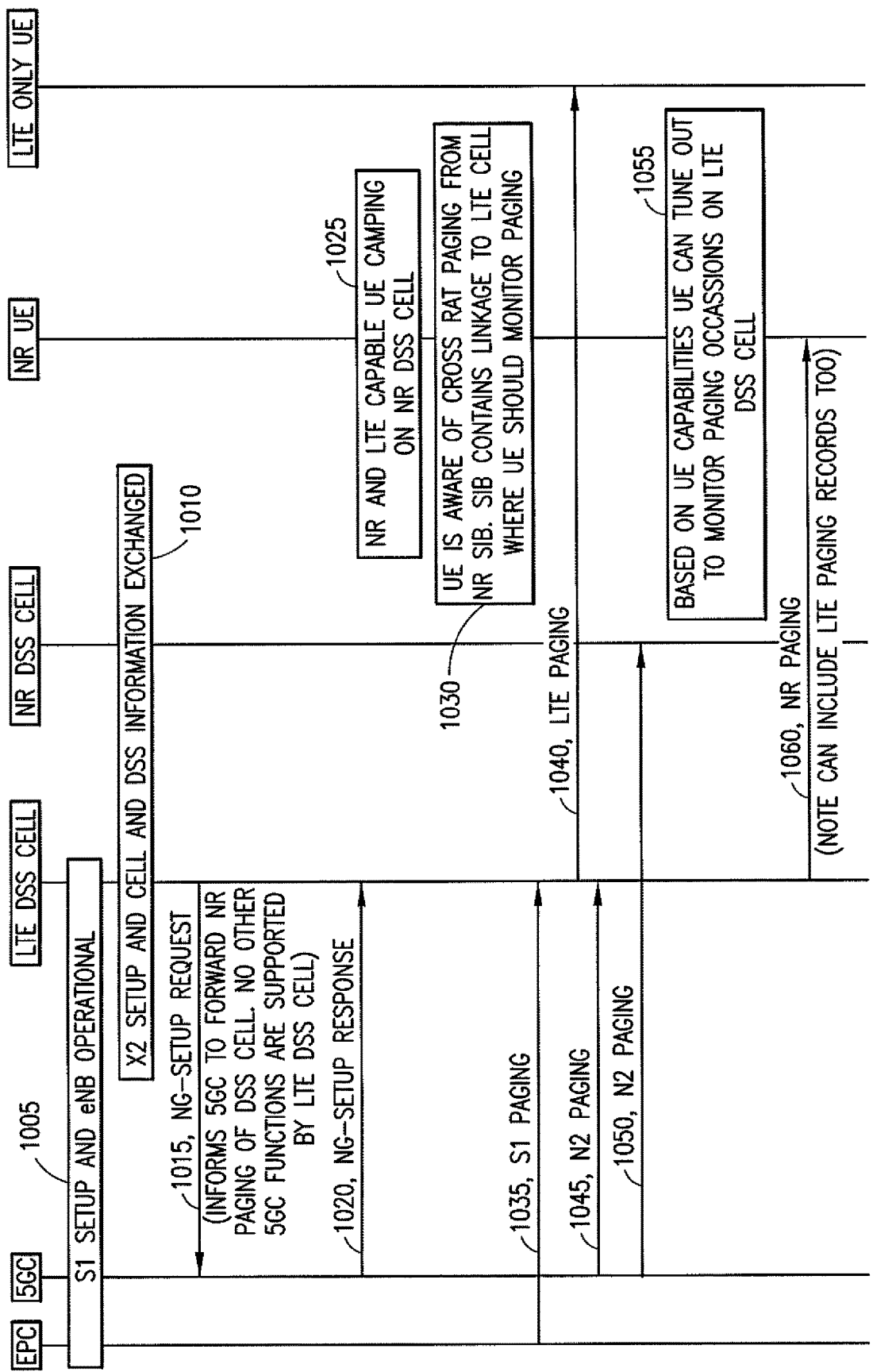
FIG. 10 shows LTE DSS Cross Paging Cell and Direct Forwarding from 5GC operations in accordance with an example embodiment of the invention.

Some possible potential deployment scenarios are listed below:

1. UE registered on 5GC and Paging cell is connected to EPC: NR MIB/SIB1 links the UE to LTE Paging cell. Paging can be forwarded by 5GC to LTE cell to UE; or alternatively the paging can be forwarded via gNB to eNB over X2; and
2. UE registered on 5GC and Paging cell is connected to 5GC: NR MIB/SIB1 links the UE to LTE Paging cell. Paging can be forwarded by 5GC to NR cell to UE or via gNB over Xn Cross cell paging in accordance with example embodiments of the invention can be enabled from the network point of view such as via the following steps as depicted in FIG. 9:

1. Serving cell sends a request to candidate Cross Paging Cell(s) where it would like to partially or totally off load its paging broadcast (steps 101/201). This request may be performed via e.g., X2/Xn interface. The request may identify the delivery method of the serving cell paging, i.e., via direct forwarding from Core Network or via forwarding from serving cell;
2. Candidate Cross Paging cell(s) shall evaluate the request from the Serving cell and decide to accept or reject the request (steps 102/202);
3. If the candidate Cross Paging cell(s) reject the request, the serving cell may decide to broadcast its own paging messages and attempt a request at a later time (steps 104/204);
4. If any of the candidate Cross Paging cell(s) accept the request from the serving cell, the serving cell shall configure its MIB or SIB in order to point UEs to the potential Cross Paging Cells.(103). The serving cell may additionally include rules to inform the UE on which cell it should respond to a paging message based on the cause of the paging or its priority. For example if the serving cell and the Cross Paging Cell are both NR cells with connectivity to the same core network, the serving cell may prioritize paging response to at least one of a high reliability services or low latency services which can comprise voice calls on the Cross Paging Cell due its larger coverage and higher reliability;
5. If the paging delivery method selected in step 1) was via direct forwarding from the core network, the Cross Paging cell(s) shall request the Core network to forward paging messages associated with the serving cell (step 206). In a cross RAT scenario, e.g., LTE-NR DSS, where the LTE cell acts as the Cross Paging Cell for the NR DSS cell, the LTE DSS cell could perform an NG Setup request to the 5GC to request only forwarding of paging messages associated with the NR DSS cell as depicted in FIG. 10. Note the Cross Paging Cell need not fully support all procedures with the CN of the serving cell;
6. If the paging delivery method selected in step 1) was via direct forwarding from the serving cell (step 106), the Cross Paging cell(s) shall e.g., receive paging messages of the serving cell over the X2/Xn interface (FIG. 11);
7. A Cross Paging cell may include a new IE or SI message to broadcast to ensure UE can uniquely identify the Cross paging cell of their serving cell. The Broadcast SI in this scenario would include the identification of the serving cell.(steps 207/208);
8. Upon reception of paging messages of the serving cell at the Cross Paging Cell(s), the Cross Paging Cell shall broadcast these following its RAT format and timing (steps 209/210). The Cross Paging Cell may combine its own paging records along with those of the serving cell to send over a single paging message over the air interface; and/or
9. Upon reception of paging messages at the serving cell, the serving cell shall forward these to the Cross Paging Cell(s) if direct forwarding to Cross Paging Cell was selected in step 1) and the serving cell may additionally broadcast the paging messages too. In scenarios where the coverage of the Cross Paging Cell is smaller or not aligned with the serving cell's coverage, the serving cell may only be able to offload paging broadcast for beams where the coverage between both the cells overlaps (steps 107/108)

FIG. 10 shows LTE DSS Cross Paging Cell and Direct Forwarding from 5GC operations in accordance with an example embodiment of the invention. In FIG. 10 there are communications between EPC, 5GC, LTE DSS Cell, NR DSS Cell, NR UE, and LTE Only UE. As shown in step 1005 of FIG. 10 there is communicated between the EPC/5GC and the LTE DSS Cell S1 setup and eNB operational information. As shown at step 1010 of FIG. 10 there is an X2 setup and DSS information exchanged between the LTE DSS Cell and the NR DSS Cell. In steps 1015 and 1020 of FIG. 10 an NG-setup request and NG-setup Response communicated between the LTE DSS Cell and the EPC/5GC. As shown in step 1025 of FIG. 10 the NR UE is capable of NR and LTE and is camping on NR DSS Cell. In step 1030 of FIG. 10 the NR UE is aware of cross RAT paging for NR SIB, and UE is monitoring paging in linkage to LTE CELL. In step 1035 of FIG. 10 the S1 paging is communicated from the EPC/5GC towards the LTE DSS Cell. In step 1040 of FIG. 10 the LTE paging is forwarded from the LTE DSS Cell towards the LTE Only UE. In steps 1045 and 1050 of FIG. 10 N2 paging is communicated from the EPC/5GC towards the LTE DSS Cell and the NR DSS Cell, respectively. In step 1055 of FIG. 10 there is, based on the UE capabilities, the UE can tune out to allow monitoring paging occasions on LTE DSS Cell. Then as shown in step 1060 of FIG. 10 NR paging is communicated between the NR DSS Cell and the NR UE.

Figure 11:
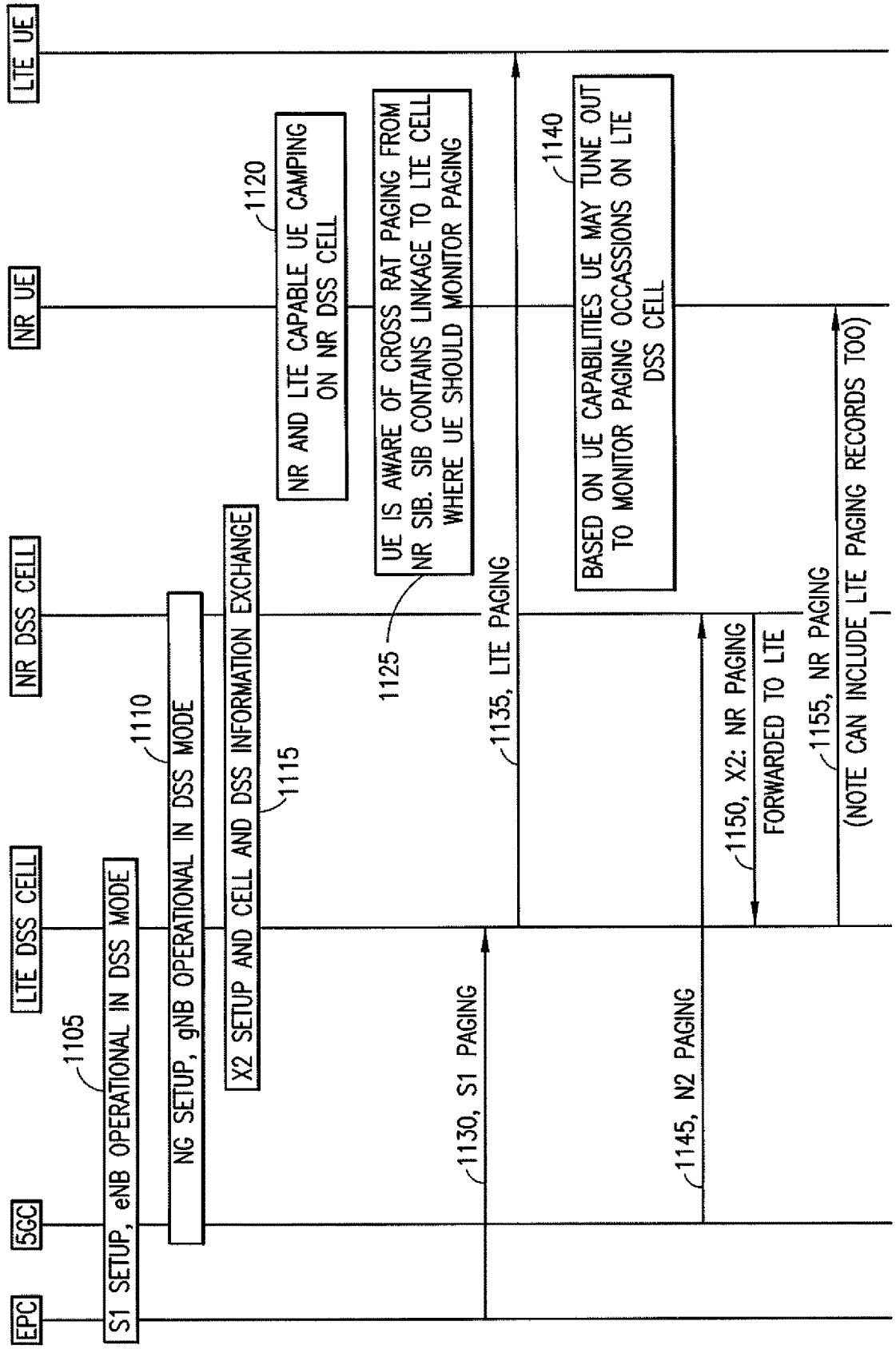
FIG. 11 shows LTE DSS Cross Paging Cell and Direct Forwarding from NR DSS Cell operations in accordance with an example embodiment of the invention.

FIG. 11 shows LTE DSS Cross Paging Cell and Direct Forwarding from NR DSS Cell operations in accordance with an example embodiment of the invention. In FIG. 11 there are communications between EPC, 5GC, LTE DSS Cell, NR DSS Cell, NR UE, and LTE UE. As shown in step 1105 of FIG. 11 there is communicated between EPC, 5GC, and the LTE DSS Cell S1 setup and eNB operational information in DSS mode. In step 1110 of FIG. 11 there is communicated been 5GC, LTE DSS Cell, and the NR DSS NG setup information such that gNB is operational in DSS mode. In step 1115 of FIG. 11 there is exchanged between the LTE DSS Cell and the NR DSS Cell X2 setup, cell, and DSS information. In step 1120 of FIG. 11 it is shown the NR UE is LTE capable and camping on the NR DSS Cell. In step 1125 of FIG. 11 it is shown that the NR UE is aware of cross RAT paging from NR SIB. As shown in step 1130 of FIG. 11 there is SI paging communicated between the EPC and the LTE DSS Cell. In step 1135 of FIG. 11 there is LTE paging communicated between the LTE DSS Cell and the LTE UE. In step 1140 of FIG. 11 there is shown that based on the NR UE capabilities the UE may tune out to monitor paging occasions on the LTE DSS Cell. In step 1145 of FIG. 11 there is communicated between the 5GC and the NR DSS Cell N2 paging. In step 1150 of FIG. 11 there is communicated between the NR DSS Cell and the LTE DSS Cell X2: NR paging forwarded to LTE. Then as shown in step 1155 of FIG. 11 there is communicated between the LTE DSS Cell and the NR UE NR paging.

A UE shall be able to identify that the paging of its serving cell is offloaded to a Cross Paging Cell via the MIB or SIB of the serving cell. The MIB/SIB of the serving cell shall identify the Cross Paging Cell(s) where the paging is offloaded and direct the UE to a single Cross Paging Cell. In idle mode the UE shall monitor the Cross Paging Cell during paging occasions in the Cross Paging Cell RAT format. The UE shall follow all idle and connected mode procedures as per the serving cell parameterization.

Figure 12:
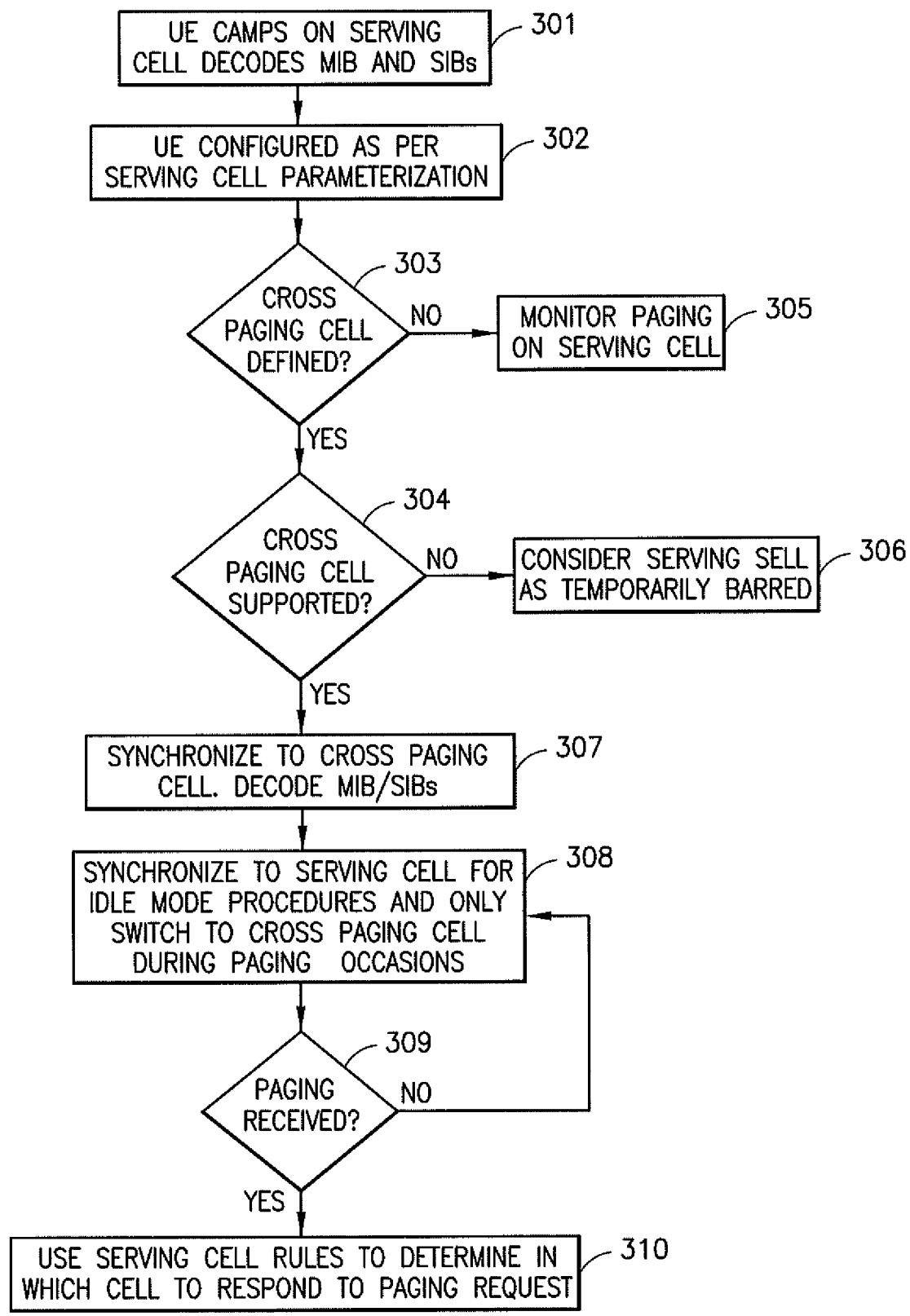
FIG. 12 shows a UE Cross Cell Paging flow chart in accordance with an example embodiment of the invention.

In accordance with an example embodiment of the invention cross cell paging can be enabled from a UE point of view, for example via the following as shown in FIG. 12:

1. UE camping on the Serving cell decodes the MIB or SIB as per normal cell (re)selection procedures (step 301). Note The UE does not require to be registered with the core network of the Cross Paging Cell;
2. The UE shall acquire all paging parameterization and other information from the serving cell. The UE shall follow Idle and connected mode procedures as instructed by the serving cell (step 302);
3. Based on MIB or SIB, the UE identifies if the paging for the serving cell is offloaded to a Cross Paging Cell and additionally acquires at least the channel frequency number of the Cross serving cell (step 303):

Note if the UE does not support the RAT, the band or other configuration aspects (bandwidth, numerology, etc) of the Cross Paging Cell, the UE shall consider the serving cell as barred (steps 304/306);

4. The UE may synch to the Cross Cell Paging and decode its SI messages, if the MIB or SIB method employed in the serving cell does not uniquely identify the Cross Paging Cell (step 307);
5. During paging occasions the UE shall tune to the Cross Paging cell to listen for paging messages in the Cross Paging Cell RAT format, numerology and waveform (308); and/or
6. If the UE receives a paging message indicating it needs to establish a connection with the network (step 309), it shall follow the idle to connected mode transition procedures as defined in its serving cell. The serving cell may define rules where it allows a UE to respond to a paging request on the Cross Paging Cell if its registered to this cell and the paging is for a certain type of service or of a certain priority (step 310). Note the serving cell rules may also apply for non-paging initiated UE requests.

It is noted that derivation of the paging occasion based on the UEs ID should be performed in a same manner for the RATs of the serving cell and Cross Paging cell. If it is not performed in the same manner UE needs to be informed of its paging occasion in the Cross Paging Cell.

As disclosed herein UE may be informed about the cell where the SI messages or beams for paging messages of the serving cell can be offloaded in accordance with example embodiments of the invention via an MIB or the SIB. Some of options to enable the serving cell to inform the UE of the Cross SIB Cell are described below.

SI and Paging/Beam Offload MIB Parameters

Option 1A via MIB: use bits in the MIB to indicate that cross cell SIB or Paging is enabled in the serving cell and some information on the Cross SIB Cell or Paging Cell. The MIB payload is limited and additional bits cannot be freely added hence the proposal is based on employing unused or reserved values.

FIG. 13 highlights MIB parameters which can be employed in accordance with example embodiments of the invention for in determining if SIB1 is transmitted and SIB1 parameterization.

The ssb-Subcarrier-Offset is also denominated as kssb. Within each kssb value the other two parameters provide 8 bits in total to configure SIB1 related configuration aspects. As shown in FIG. 14 there are many reserved kssb values each providing 8 bits which can be used towards configuring the Cross SIB Cell.

As an example, if the serving cell and the Cross SIB Cell and/or Paging Cell are NR cells, since the NR-ARFCN requires 22 bits, at least 3 kssb reserved values would be required. The kssb values=0, 1 and 2 could be used along with the 8 bits of ControlResourceSetZero and SearchSpaceZero to provide 24 bits. The 2 remaining bits form the kssb=0,1 and 2 could be employed to for example signal the SSB numerology of the Cross SIB Cell and/or Paging Cell. Additional reserved kssb values could be employed if more information on the Cross SIB cell is required to be provided to the UE e.g., the RAT type.

As stated previously, for beam based access cells, several Cross SIB Cells and/or Paging Cells could be employed, one per SSB beam, and hence the kssb values 0,1 and 2, from the example above, could point to different NR-ARFCNs or not point to any NR-ARFCN indicating the SIB and/or Paging for those beams is broadcast by the serving cell.

It is noted that in accordance with example embodiments of the invention for paging/beam offload a serving cell may additionally reserve more kssb values to include rules to inform the UE on which cell it should respond to a paging message based on the cause of the paging or its priority. For example if the serving cell and the Cross Paging Cell are both NR cells with connectivity to the same core network, the serving cell may prioritize paging response to at least one of a high reliability service or low latency service such as voice calls on the Cross Paging Cell due its larger coverage and higher reliability. The rules of the serving cell may also apply to idle to connected mode transitions of the UE where paging is not involved.

Option 1B via MIB: This option relies on the same principles as option 1A, however it trades-off flexibility in the configuration of the Cross SIB Cell and/or Paging Cell in exchange for employing less reserved kssb values. Option 1B proposes to identify the Cross SIB cell and/or Paging Cell via semi-static mapping of the MIB parameters. The proposed solution here would be to standardize the meaning of certain parameter values leaving other to be configured by operators. The semi-static configurations may be updated in the UE via for example OTA updates from the operator.

As a non-limiting example:

Assuming:

Kssb=0 is employed; and

ControlResourceSetZero and SearchSpaceZero are combined to provide 255 different configurations Interpretation of the combined ControlResourceSetZero and SearchSpaceZero:

0—Cross SIB Cell and/or Paging cell is LTE with same band, bandwidth and PCI as NR serving cell;

1—Cross SIB Cell and/or Paging cell is LTE with same band and PCI as NR serving cell with EAFRCN shifted XX MHz;

2—Cross SIB Cell and/or Paging cell is NR with same band as NR serving cell, same PCI with NRAFRCN shifted XX MHz;

3—Cross SIB Cell and/or Paging cell is NR with same band as NR serving cell, same PCI with NRAFRCN shifted YY MHz; and 4 . . . 254—Reserved Operator may update the meaning of the reserved values in the UEs via OTA updates. Note some standardized values are required since OTA updates may be challenging for roaming devices Option 2 via SIB: In this option the pointer to the Cross SIB Cell and/or Paging cell can be based on serving cell broadcasted SIB1 or other SI message. To enable this, it would require to include a new IE in SIB1 (or Other SI). The Cross SIB Cell and/or Paging cell could be identified by the following information elements:

Frequency band indicator;

NRARFCN/EARFCN;

SSB subcarrier spacing (Only for NR Cross SIB Cell); and

NCGI/ECGI

Additional information could be provided within the new IE if it can assist the UE in faster identification and synchronization to the Cross SIB Cell.

Furthermore, for paging/beam offload the serving cell may additionally to include IEs with rules to inform the UE on which cell it should respond to a paging message based on the cause of the paging or its priority. For example, if the serving cell and the Cross Paging Cell are both NR cells with connectivity to the same core network, the serving cell may prioritize paging response to at least one of a high reliability service or low latency service such as voice calls on the Cross Paging Cell due its larger coverage and higher reliability. The rules of the serving cell may also apply to idle to connected mode transitions of the UE where paging is not involved.

Note that both options to identify the Cross SIB Cell, via SIB and MIB can be specified and then it could be left to the operator to decide based on flexibility of the mapping required, and reduced overheads in the serving cell vs the Cross SIB Cell.

Figure 16:
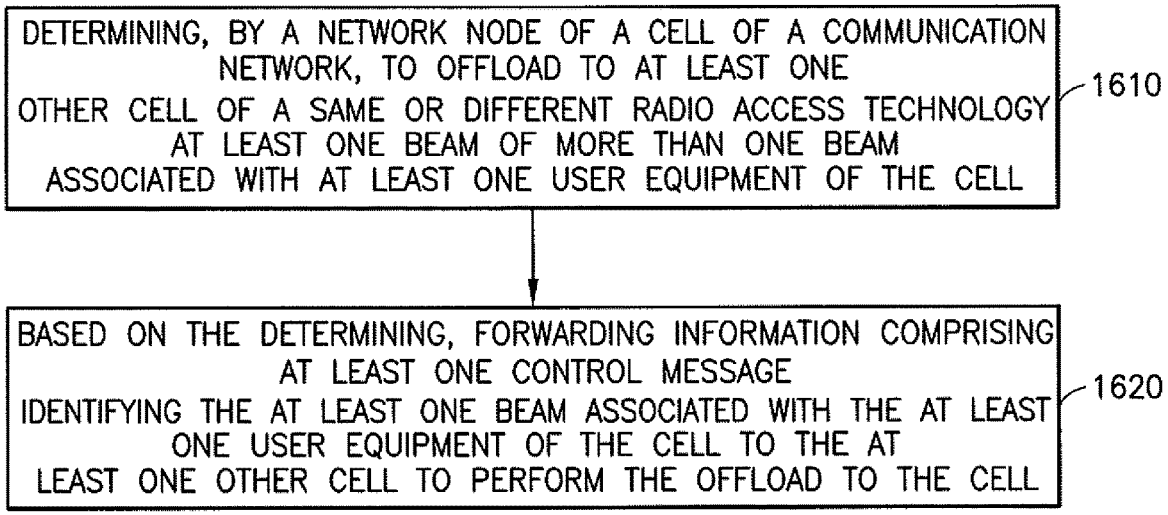
FIG. 16 shows a method which may be performed by a network node such as a base station

FIG. 16 illustrates operations which may be performed in accordance with example embodiments of the invention by a network device such as, but not limited to, a network node NN 12 and/or NN13 as in FIG. 15 or an eNB or gNB. As shown in step 1610 of FIG. 16 there is determining, by a network node of a cell of a communication network, to offload to at least one other cell of a same or different radio access technology at least one beam of more than one beam associated with at least one user equipment of the cell. Then as shown in step 1620 of FIG. 16 there is, based on the determining, forwarding information comprising at least one control message identifying the at least one beam associated with the at least one user equipment of the cell to the at least one other cell to perform the offload to the cell.

In accordance with the example embodiments as described in the paragraph above, wherein the information comprises at least one information block configured with the at least one control message for broadcasting towards the at least one user equipment to at least identify the at least one beam of the offload.

In accordance with the example embodiments as described in the paragraphs above, wherein the at least one information block is identifying the at least one other cell where the at least one beam is offloaded to.

In accordance with the example embodiments as described in the paragraphs above, wherein the offload comprises at least one of an offload of system information broadcasting or an offload of paging messages broadcasting from a serving cell for the at least one user equipment, wherein the system information offload or paging message offload can be partial or total, and wherein the network node may choose to broadcast the system information messages or the paging messages for specific beams and offload the SI messages or the paging messages for other beams to another cell.

In accordance with the example embodiments as described in the paragraphs above, wherein the at least one control message is for at least one paging message associated with the at least one user equipment, and wherein the configuring comprises: configuring the at least one information block to inform the at least one user equipment, when it receives the at least one paging message offload from the cell, a cell of the communication network that the user equipment of at least one user equipment should respond to.

In accordance with the example embodiments as described in the paragraphs above, wherein based on the at least one user equipment being registered in the at least one other cell, the configuring comprises: configuring the at least one information block to allow the at least one user equipment to respond to paging messages of the at least one paging message for certain types of service in the at least one other cell.

In accordance with the example embodiments as described in the paragraphs above, wherein the configuring comprises: configuring the at least one control message of the at least one information block to prioritize paging messages of the at least one paging message based on the paging messages being associated with at least one of a high reliability service or low latency service such as for example a voice call.

In accordance with the example embodiments as described in the paragraphs above, wherein the at least one information block comprises at least one of a master information block or system information block.

In accordance with the example embodiments as described in the paragraphs above, wherein the at least one information block is communicated with the at least one other cell is using an X2 interface.

In accordance with the example embodiments as described in the paragraphs above, wherein the at least one control message is for at least one system information message associated with the at least one user equipment, and wherein the configuring comprises: configuring the at least one information block to inform the at least one user equipment from which cell of the communication network that the least one system information message is received.

In accordance with the example embodiments as described in the paragraphs above, wherein based on the at least one user equipment being registered in the at least one other cell, the configuring comprises: configuring the at least one information block to inform the at least one user equipment from which cell of the communication network that the least one system information message is received.

In accordance with the example embodiments as described in the paragraphs above, wherein the configuring comprises: configuring the at least one control message of the at least one information block to prioritize system information messages of the at least one system information message based on the at least one system information message being associated with specific services.

In accordance with the example embodiments as described in the paragraphs above, wherein the specific services comprises at least one of high reliability services or low latency services.

In accordance with the example embodiments as described in the paragraphs above, wherein the specific services comprises voice call services A non-transitory computer-readable medium (MEM 12B and/or MEM 14B as in FIG. 15) storing program code (PROG 12C and/or PROG 13C as in FIG. 15), the program code executed by at least one processor (DP 12A and/or DP 13A as in FIG. 15) to perform the operations as at least described in the paragraphs above.

In accordance with an example embodiment of the invention as described above there is an apparatus comprising: means for determining (DP 12A and/or DP 13A, PROG 12C and/or PROG 13C, and MEM 12B and/or MEM 13B as in FIG. 15), by a network node (NN 12 and/or NN 13 as in FIG. 15) of a cell of a communication network (Network 1 as in FIG. 15), to offload to at least one other cell of a same or different radio access technology at least one beam of more than one beam associated with at least one user equipment of the cell; and means, based on the determining, for forwarding (TRANS 12D and/or TRANS 13D, DP 12A and/or DP 13A, PROG 12C and/or PROG 13C, and MEM 12B and/or MEM 13B as in FIG. 15) information comprising at least one control message identifying the at least one beam associated with the at least one user equipment of the cell to the at least one other cell to perform the offload to the cell.

In the example aspect of the invention according to the paragraph above, wherein at least the means for determining and forwarding comprises a non-transitory computer readable medium [MEM 12B and/or MEM 13B] encoded with a computer program [PROG 12C and/or PROG 13C] executable by at least one processor [DP 12A and/or DP 13A as in FIG. 15].

Figure 17:
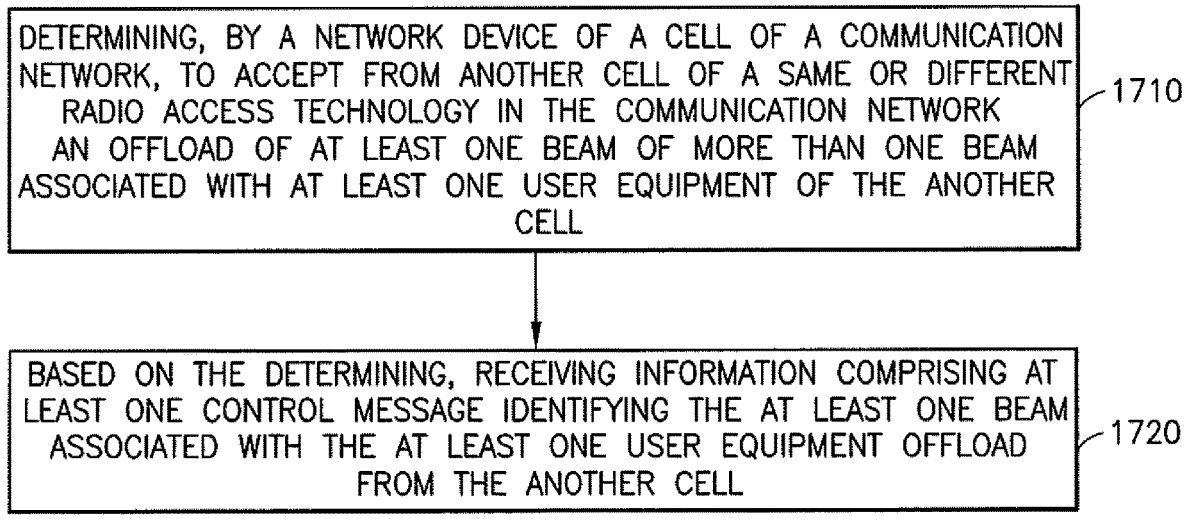
FIG. 17 shows a method which may be performed by a network device such as a base station.

FIG. 17 illustrates further operations which may be performed by a network device in accordance with example embodiments of the invention such as, but not limited to, a network node NN 12 and/or NN13 as in FIG. 15 or an eNB or gNB. As shown in step 1710 of FIG. 17 there is determining, by a network device of a cell of a communication network, to accept from another cell of a same or different radio access technology in the communication network an offload of at least one beam of more than one beam associated with at least one user equipment of the another cell. Then as shown in step 1720 of FIG. 17 there is, based on the determining, receiving information comprising at least one control message identifying the at least one beam associated with the at least one user equipment offload from the another cell.

In accordance with the example embodiments as described in the paragraph above, wherein the determining comprises: determining to accept the offload from the another cell; and based on the acceptance, setting up with the another cell a connection for receiving the information.

In accordance with the example embodiments as described in the paragraphs above, wherein the connection is using an X2 and/or Xn interface.

In accordance with the example embodiments as described in the paragraphs above, wherein the information comprises at least one information block configured with the at least one control message for broadcasting towards the at least one user equipment to at least identify to the at least one user equipment the at least one beam for the offload.

In accordance with the example embodiments as described in the paragraphs above, wherein the at least one control message is identifying a cells radio access technology, frequency, timing acquisition, and/or at least one new information element associated with acquisition of said information.

In accordance with the example embodiments as described in the paragraphs above, there is broadcasting towards the at least one user equipment information comprising the at least one information block.

In accordance with the example embodiments as described in the paragraphs above, wherein the at least one control message of the at least one information block is for at least one paging message associated with the at least one user equipment, and wherein the at least one control message to allow the at least one user equipment to respond to paging messages of the at least one paging message which are for certain types of service in the another cell or different cell.

In accordance with the example embodiments as described in the paragraphs above, there is providing to the at least one user equipment information comprising at least a channel frequency and radio access technology of the another cell for the offload; and based on the information, synching with the at least one user equipment on the radio access technology of the another cell to provide to the at least one user equipment a timing and periodicity of system information messages broadcast in the another cell.

In accordance with the example embodiments as described in the paragraphs above, wherein providing the information is performed one of before or after a handover of the at least one user equipment to the another cell.

In accordance with the example embodiments as described in the paragraphs above, wherein the at least one control message is prioritizing in response at the cell or another cell paging message responses to certain services, such as at least one of a high reliability service or low latency service such as for example voice calls.

In accordance with the example embodiments as described in the paragraphs above, wherein the at least one information block comprises at least one of a master information block or system information block.

In accordance with the example embodiments as described in the paragraphs above, wherein the at least one control message of the at least one information block is for at least one system information message associated with the at least one user equipment, and wherein the at least one control message to allow the at least one user equipment to receive system information messages which are for certain types of service in the another cell or a different cell, such as for example specific services.

In accordance with the example embodiments as described in the paragraphs above, wherein the specific services comprises at least one of high reliability services or low latency services.

In accordance with the example embodiments as described in the paragraphs above, wherein the specific services comprises voice call services.

In accordance with the example embodiments as described in the paragraphs above, there is providing to the at least one user equipment information comprising at least a channel frequency and radio access technology of the another cell for the offload; and based on the information, synching with the at least one user equipment on the radio access technology of the another cell to provide to the at least one user equipment a timing and periodicity of system information messages broadcast in the another cell.

In accordance with the example embodiments as described in the paragraphs above, wherein providing the at least one system information message is performed one of before or after a handover of the at least one user equipment to the another cell.

In accordance with the example embodiments as described in the paragraphs above, wherein the at least one control message is prioritizing in response at the cell paging message responses to certain services such as at least one of a high reliability service or low latency service.

In accordance with the example embodiments as described in the paragraphs above, wherein the specific services comprises at least one of high reliability services or low latency services.

In accordance with the example embodiments as described in the paragraphs above, wherein the specific services comprises voice call services.

A non-transitory computer-readable medium (MEM 12B and/or MEM 14B as in FIG. 15) storing program code (PROG 12C and/or PROG 13C as in FIG. 15), the program code executed by at least one processor (DP 12A and/or DP 13A as in FIG. 15) to perform the operations as at least described in the paragraphs above.

In accordance with an example embodiment of the invention as described above there is an apparatus comprising: means for determining (TRANS 12D and/or TRANS 13D, DP 12A and/or DP 13A, PROG 12C and/or PROG 13C, and MEM 12B and/or MEM 13B as in FIG. 15), by a network device (NN 12 and/or NN13 as in FIG. 15) of a cell of a communication network (Network 1 as in FIG. 15), to accept from another cell of a same or different radio access technology in the communication network an offload of at least one beam of more than one beam associated with at least one user equipment of the another cell; and means, based on the determining, for receiving (TRANS 12D and/or TRANS 13D, DP 12A and/or DP 13A, PROG 12C and/or PROG 13C, and MEM 12B and/or MEM 13B as in FIG. 15) information comprising at least one control message identifying the at least one beam associated with the at least one user equipment offload from the another cell.

In the example aspect of the invention according to the paragraph above, wherein at least the means for determining and receiving comprises a non-transitory computer readable medium [MEM 12B and/or MEM 13B] encoded with a computer program [PROG 12C and/or PROG 13C] executable by at least one processor [DP 12A and/or DP 13A as in FIG. 15].

Figure 18:
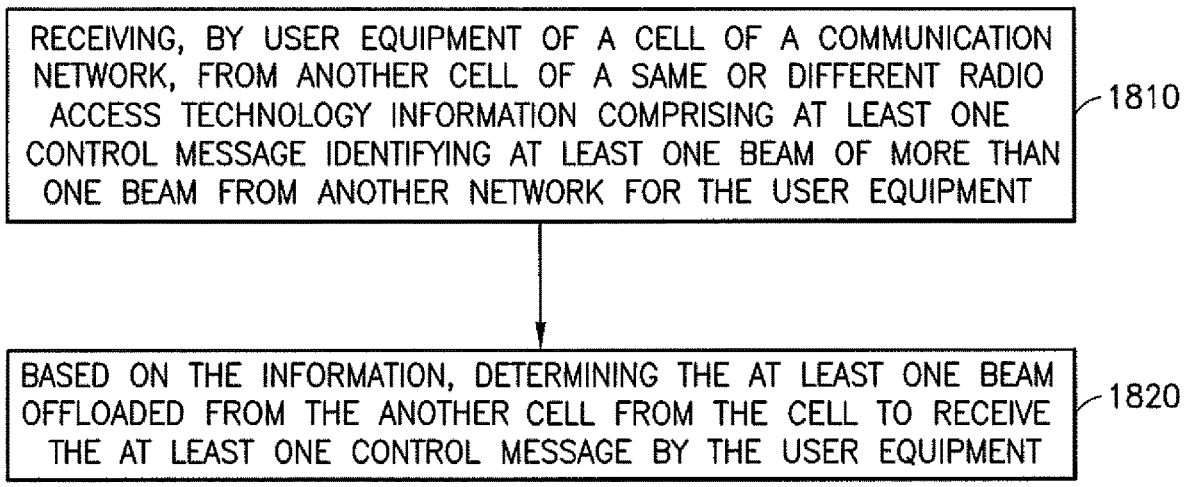
FIG. 18 shows a method which may be performed by a network device such as a user equipment.

FIG. 18 illustrates operations which may be performed by a device such as, but not limited to, a device (e.g., the UE 10 as in FIG. 2) in accordance with example embodiments of the invention. As shown in step 1810 of FIG. 18 there is receiving, by user equipment of a cell of a communication network, from another cell of a same or different radio access technology information comprising at least one control message identifying at least one beam of more than one beam from another network for the user equipment. Then as shown in step 1820 of FIG. 18 there is, based on the information, determining the at least one beam offloaded from the another cell from the cell to receive the at least one control message by the user equipment.

In accordance with the example embodiments as described in the paragraph above, wherein the information comprises at least one information block configured with the at least one control message for enabling the at least one user equipment to identify the at least one beam for the offload.

In accordance with the example embodiments as described in the paragraphs above, wherein the at least one control message is identifying the cell where the at least one beam is offloaded to.

In accordance with the example embodiments as described in the paragraphs above, wherein the at least one control message is for at least one paging message associated with the at least one user equipment, and wherein the at least one control message is identifying to the user equipment another cell where the at least one paging message was forwarded and directs the user equipment to the another cell.

In accordance with the example embodiments as described in the paragraphs above, wherein the at least one control message is informing the user equipment, based on at least one of a cause or a priority of the at least one paging message, a cell of the communication network that the at least one user equipment should respond to.

In accordance with the example embodiments as described in the paragraphs above, there is based on the informing, determining by the user equipment information comprising at least a channel frequency and radio access technology of the another cell for the offload; and based on the information, synching with the another cell or another different cell based on the radio access technology of the another cell to acquire a timing and periodicity of system information messages broadcast in the another cell.

In accordance with the example embodiments as described in the paragraphs above, wherein the determining the information is performed one of before or after a handover of the user equipment to the another cell.

In accordance with the example embodiments as described in the paragraphs above, wherein the at least one control message is indicating an allowance of the user equipment to respond to paging messages of the at least one paging message which are for certain types of service in the another cell or a different cell.

In accordance with the example embodiments as described in the paragraphs above, wherein the user equipment is camped on the another cell and wherein the user equipment acquires the at least one control message while the user equipment is in an idle mode.

In accordance with the example embodiments as described in the paragraphs above, wherein the at least one control message is indicating a prioritization at the cell of paging message responses to at least one of a high reliability service or low latency service such as voice calls.

In accordance with the example embodiments as described in the paragraphs above, wherein the at least one information block comprises at least one of a master information block or system information block.

In accordance with the example embodiments as described in the paragraphs above, wherein the at least one control message is for at least one system information message associated with the at least one user equipment, and wherein the at least one control message is identifying to the user equipment another cell where the at least one system information message was forwarded and directs the user equipment to the another cell.

In accordance with the example embodiments as described in the paragraphs above, wherein the at least one control message is informing the user equipment, based on at least one of a cause or a priority of the at least one system information message, a cell of the communication network that the at least one system information message is received from.

In accordance with the example embodiments as described in the paragraphs above, there is, based on the informing, determining by the user equipment information comprising at least a channel frequency and radio access technology of the another cell for the offload; and based on the information, synching with the another cell based on the radio access technology of the another cell to acquire a timing and periodicity of system information messages broadcast in the another cell.

In accordance with the example embodiments as described in the paragraphs above, wherein the determining the information is performed one of before or after a handover of the user equipment to the another cell.

In accordance with the example embodiments as described in the paragraphs above, wherein the at least one control message is indicating an allowance of the user equipment to receive system information messages of the at least one system information message which are for certain types of service in the another cell or a different cell.

In accordance with the example embodiments as described in the paragraphs above, wherein the user equipment is camped on the another cell and wherein the user equipment acquires the at least one control message while the user equipment is in an idle mode.

In accordance with the example embodiments as described in the paragraphs above, wherein the at least one control message is indicating a prioritization at the cell of the at least one system information message responses to specific services.

In accordance with the example embodiments as described in the paragraphs above, wherein the specific services comprises at least one of high reliability services or low latency services.

In accordance with the example embodiments as described in the paragraphs above, wherein the specific services comprises voice call services.

A non-transitory computer-readable medium (MEM 10B as in FIG. 15) storing program code (PROG 10C as in FIG. 15), the program code executed by at least one processor (DP 10A as in FIG. 15) to perform the operations as at least described in the paragraphs above.

In accordance with an example embodiment of the invention as described above there is an apparatus comprising: means for receiving (TRANS 10D, DP 10A, PROG 10C, and MEM 10B as in FIG. 15), by user equipment (UE 10 as in FIG. 15) of a cell of a communication network (Network 1 as in FIG. 15), from another cell of a same or different radio access technology information comprising at least one control message identifying at least one beam of more than one beam from another network for the user equipment; and means, based on the information, for determining (TRANS 10D, DP 10A, PROG 10C, and MEM 10B as in FIG. 15) the at least one beam offloaded from the another cell from the cell to receive the at least one control message by the user equipment.

In the example aspect of the invention according to the paragraph above, wherein at least the means for determining and receiving comprises a non-transitory computer readable medium [MEM 10B] encoded with a computer program [PROG 10C] executable by at least one processor [DP 10A as in FIG. 15].

Potential Use Cases Include:
For DSS use case, the NR DSS PCell MIB/SIB would need to include information of the LTE cell where the SI messages are offloaded and/or Paging is going to be sent, for NR UEs camping on the NR DSS cell. This would allow the NR DSS cell to better utilize its NR PDCCH and PDSCH resources;

FR2-FR1 use case: FR2 cells need to broadcast SI messages and/or Paging messages via all their beams used for control channels. This imposes a large overhead for FR2 implementations based on analog beamforming. In this scenario a UE camping on a FR2 Pcell, could be instructed via the MIB/SIB of the FR2 serving cell to decode certain SI messages and/or Paging messages on an FR1 cell. This avoids overheads of for example, analog beamforming in FR2 for SI message broadcasting and/or Paging and at the same time increases reliability of the SI messages and/or Paging;

For interference reduction purposes, e.g.: n48-n77 bands in the US. The C-band in the US will employ 3GPP band n77 and is allowed a very high transmission power compared to n48 band which is adjacent in frequency to the US C-band. This scenario can lead to the possibility blocking and/or interference to n48. Cross cell SI message broadcasting and/or Paging could be employed as an interference reduction technique. Here since n77 coverage is much larger than n48 coverage, the offload of n77 SI beams which are covered by n48 cell could help reduce the interference conditions;

Potentially we could apply this for other intra NR deployment scenarios, e.g., NR-U serving cell and NR Licensed cell acts as Cross SIB or Cross Paging Cell;

The invention also applies to system efficiency and overhead reduction for above 52.6 GHz frequency range which is currently being discussed within 3GPP. At these high frequencies, propagation is highly dependent on line of sight and hence offloading SI message broadcasting or Paging to a more reliable frequency layer could enable Pcell operation in these frequencies.

In addition, certain example embodiments of the invention as disclosed herein would allow for reduced overheads of e.g., NR cells, leveraging another layer/RAT with higher reliability or more capacity for paging purposes. Serving cell and Paging cell need not be the same RAT on the same band or even have the same waveform or coverage characteristics.

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:

(a) hardware-only circuit implementations (such as implementations in only analog and/or digital circuitry);
(b) combinations of hardware circuits and software, such as (as applicable):
  (i) a combination of analog and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
(c) hardware circuit(s) and or processor(s), such as a microprocessor(s) or a portion of a microprocessor(s), that requires software (e.g., firmware) for operation, but the software may not be present when it is not needed for operation."

As used in this application, the term 'circuitry' refers to all of the following:
(a) hardware-only circuit implementations (such as implementations in only analog and/or digital circuitry); and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
  determining, by a network node of a cell of a communication network, to offload to at least one other cell of a same or different radio access technology for at least one beam of more than one beam associated with at least one user equipment of the cell, wherein the offload comprises an offload from a serving cell towards the at least one other cell of at least one of system information broadcasting or paging messages broadcasting; and
  based on the determining, forwarding towards the at least one other cell for broadcasting towards the at least one user equipment information comprising at least one information block configured with at least one control message associated with the at least one of system information broadcasting or paging messages broadcasting, the at least one information block comprising at least one of a master information block or a system information block and identifying the at least one beam associated with the at least one user equipment of the cell to perform the offload.

2. The method of claim 1, wherein the at least one information block is identifying the at least one other cell where the at least one beam is offloaded to.

3. The method according to claim 1, wherein the cell and the at least one other cell are using different radio access technologies, and wherein the cell is using one of a long term evolution, new radio, or 5G radio technology and the at least one other cell is using a different one of a long term evolution, new radio, or 5G radio technology.

4. The method according to claim 1, wherein the system information broadcasting offload or paging messages broadcasting offload to the at least one other cell can be partial or total, and wherein the network node may choose to broadcast the system information messages or the paging messages for specific beams and offload the system information messages or the paging messages for other beams to another cell.

5. The method of claim 1, wherein the at least one information block is communicated with the at least one other cell is using an X2 or Xn interface.

6. A method, comprising:
   determining, by a network device of a cell of a communication network, to accept from another cell of a same or different radio access technology in the communication network an offload of at least one beam of more than one beam associated with at least one user equipment of the another cell, wherein the offload comprises an offload from a serving cell towards the cell of at least one of system information broadcasting or paging messages broadcasting;
   based on the determining, receiving information for broadcasting towards the at least one user equipment comprising at least one information block configured with at least one control message associated with the at least one of system information broadcasting or paging messages broadcasting, the at least one information block comprising at least one of a master information block or a system information block and identifying the at least one beam associated with the at least one user equipment offload from the another cell.

7. The method of claim 6, wherein the determining comprises:
   determining to accept the offload from the another cell; and
   based on the acceptance, setting up with the another cell a connection for receiving the information.

8. The method of claim 7, wherein the connection is using an X2 or Xn interface.

9. The method of claim 6, wherein the at least one control message is identifying at least one of the other cells radio access technology, frequency and timing acquisition, or at least one new information element associated with the acquisition of said information.

10. The method of claim 6, comprising: broadcasting towards the at least one user equipment information comprising the at least one information block.

11. The method of claim 6, wherein the at least one control message of the at least one information block is for at least one of a paging message or System information message associated with the at least one user equipment, and wherein the at least one control message is to allow the at least one user equipment to receive only paging messages of the at least one paging message or System Information message which are for certain types of service in the another cell.

12. A method, comprising:
   receiving, by user equipment of a cell of a communication network, from a serving cell via another cell of a same or different radio access technology information comprising at least one information block configured with at least one control message associated with at least one of system information broadcasting or paging messages broadcasting offloaded from the serving cell, the at least one information block comprising at least one of a master information block or a system information block and identifying at least one beam of more than one beam from another network for the user equipment; and
   based on the information, determining the at least one beam offloaded from the another cell and receiving from the another cell the at least one of system information broadcasting or paging messages broadcasting offloaded from the serving cell.

13. The method of claim 12, wherein the at least one control message is identifying the cell where the at least one beam is offloaded to.

14. The method of claim 12, wherein the at least one control message is for at least one paging message or system information message associated with the user equipment, and wherein the at least one control message is identifying to the user equipment another cell where the at least one paging message was forwarded and directs the user equipment to the another cell.

* * * * *